United States Patent
Kadambe et al.

(10) Patent No.: US 7,457,745 B2
(45) Date of Patent: Nov. 25, 2008

(54) METHOD AND APPARATUS FOR FAST ON-LINE AUTOMATIC SPEAKER/ENVIRONMENT ADAPTATION FOR SPEECH/SPEAKER RECOGNITION IN THE PRESENCE OF CHANGING ENVIRONMENTS

(75) Inventors: Shubha Kadambe, Thousand Oaks, CA (US); Ron Burns, Oceanside, CA (US); Markus Iseli, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 805 days.

(21) Appl. No.: 10/728,106

(22) Filed: Dec. 3, 2003

(65) Prior Publication Data
US 2004/0230420 A1 Nov. 18, 2004

Related U.S. Application Data

(60) Provisional application No. 60/430,788, filed on Dec. 3, 2002.

(51) Int. Cl.
*G10L 19/00* (2006.01)
(52) U.S. Cl. .................. 704/216; 704/243; 704/244
(58) Field of Classification Search ................ 704/243, 704/244, 255, 256, 258, 231, 236, 270, 216, 704/250, 246
See application file for complete search history.

(56) References Cited

U.S. PATENT DOCUMENTS 6,766,295 B1 * 7/2004 Murveit et al. .............. 704/243

OTHER PUBLICATIONS

A. Sankar, et al., "A maximum likelihood approach to stochastic matching for robust speech recognition," IEEE TSAP, vol. 4, pp. 190-202, May 1996.

(Continued)

*Primary Examiner*—Huyen X. Vo
(74) *Attorney, Agent, or Firm*—Tope-McKay & Associates

(57) ABSTRACT

A fast on-line automatic speaker/environment adaptation suitable for speech/speaker recognition system, method and computer program product are presented. The system comprises a computer system including a processor, a memory coupled with the processor, an input coupled with the processor for receiving acoustic signals, and an output coupled with the processor for outputting recognized words or sounds. The system includes a model-adaptation system and a recognition system, configured to accurately and efficiently recognize on-line distorted sounds or words spoken with different accents, in the presence of randomly changing environmental conditions. The model-adaptation system quickly adapts standard acoustic training models, available on audio recognition systems, by incorporating distortion parameters representative of the changing environmental conditions or the speaker's accent. By adapting models already available to the new environment, the system does not need separate adaptation training data.

123 Claims, 7 Drawing Sheets

OTHER PUBLICATIONS

R. C. Rose et al., "Integ. models of signal and backgd with appl. to speaker id. in noise," IEEE TSAP, vol. 2, No. 2, pp. 245-257, Apr. 1994.

Hui Jiang, et al., "A robust compensation strategy for extraneous acoustic variations in spontaneous speech recognition," IEEE TSAP, vol. 10, No. 1, pp. 9-17, Jan. 2002.

J. McDonough, T. Schaaf, and A. Waibel, "On maximum mutual information speaker-adapted training", ICAASP 2002, vol. 1, pp. 601-604, 2002.

B. Zhou, et al., "Rapid speaker adaptation using multi-stream structural max likelihood eigenspace mapping," ICASSP 2002, vol. 4, pp. 4166-4169, 2002.

J-T Chien, "Online unsupervised learning of hidden Markov models for adaptive speech rec.," IEE Proceedings on Vision, I. & S. Proc., vol. 148, No. 5, pp. 315-324, Oct. 2001.

S. Wang, et al., "Online Bayesian tree-structured transformation of HMMs with optimal model selection for speaker adaptation," IEEE TSAP, vol. 9, No. 6, Sep. 2001.

* cited by examiner

Recognition accuracy (word level) of noisy speech signals

Conceptual description of adaptation

METHOD AND APPARATUS FOR FAST ON-LINE AUTOMATIC SPEAKER/ENVIRONMENT ADAPTATION FOR SPEECH/SPEAKER RECOGNITION IN THE PRESENCE OF CHANGING ENVIRONMENTS

PRIORITY CLAIM

This application claims the benefit of priority to provisional application No. 60/430,788, filed in the United States on Dec. 3, 2002, and titled "Fast On-line speaker/environment adaptation using modified maximum likelihood stochastic matching".

BACKGROUND

1. Technical Field

The present invention relates to the fields of signal processing, speech processing, machine learning, and probabilistic methods. More specifically the invention pertains to fast on-line adaptation of acoustic training models to achieve robust automatic audio recognition in the presence of sound disturbances, such as the disturbances created by changing environmental conditions, deviation of a speaker's accent from the standard language, and deviation of a sound from the standard sound characteristics.

2. Discussion

One recent technological trend is the use of automatic speech recognition (ASR) systems in many commercial and defense applications such as information retrieval, air travel reservations, signal intelligence for surveillance, voice activated command and control systems, and automatic translation. However, in all of these applications robustness is a primary issue since the ASR system's performance degrades easily if any interference signals are present, or the ASR testing environment is significantly significantly from the standard language pronunciation, or a non-native speaker uses the system. Furthermore, the ASR systems must perform recognition in real-time in order for the users to be able to comfortably use the system and to be satisfied with the results.

The ASR system's performance degrades even further, as the spoken dialogue information retrieval applications are becoming more popular for mobile users in automobiles using cellular telephones. Due to the typical presence of background noise and other interfering signals when using a mobile system, speech recognition accuracy reduces significantly if it is not trained explicitly using the specific noisy speech signal for each environment. This situation also applies to noisy sound signals distorted by changing environments, which need to be recognized and classified by an automatic sound recognition system. The sound recognition accuracy reduces significantly if the system is not trained explicitly using the specific noisy sound signal for each environment. Since it is very hard to know a priori the environment in which mobile platforms are going to be used, the number of interfering signals that are present, and who would be using the system (a standard speaker or a non-standard speaker, and if non-standard from which regional accent or which mother tongue), it is not practical to train recognizers for the appropriate range of typical noisy environments and/or non-standard speakers.

Therefore, it is imperative that the automatic audio recognition systems are robust to mismatches in training and testing environments. The mismatches in general correspond to variations in background acoustic environment, non-standard speakers, and channel deviations. Several techniques have been developed to address the robustness issues in ASR. These techniques can be broadly classified into front-end processing and speaker/environment adaptation, as discussed in "A maximum likelihood approach to stochastic matching for robust speech recognition," *IEEE Trans. On Speech and Audio Processing*, vol. 4, pp. 190-202, May 1996, by A. Sankar and C-H. Lee. The front-end processing techniques mainly try to remove the noise from an acoustic input signal (cleaning up the input signal) prior to attempting to recognize the acoustic signal. These techniques do not work well with constantly changing environmental conditions, or with speakers who deviate from the standard language pronunciation, since it is not noise that is deforming the input signal.

On the other hand, the adaptation techniques conceptually correspond to projecting the trained models to the testing environment. These techniques work well with changing environmental conditions or with nonstandard speakers only if the system has a large amount of training models that closely resemble the changing environmental conditions, the deviation of a speaker from the standard language, and the deviation of a sound from the standard sound characteristics. This kind of projection can be performed at signal space, at feature space, and at model space.

Most of the state of the art adaptation techniques developed to date perform the projection in the model space and are based on linear or piece-wise linear transformations. These techniques are computationally expensive, need separate adaptation training data that models the current environment and sound input, and these techniques are not applicable to derivatives of cepstral coefficients. All of these factors contribute to slow down the adaptation process and, therefore, prevent the prior art techniques from achieving adaptation in real-time.

Thus, artisans are faced with competing goals. First: maintaining the speech recognition accuracy or robustness, and second: performing the first goal in real time. For the foregoing reasons, there is a great need for fast on-line adaptation of acoustic training models to achieve robust automatic audio recognition in the presence of sound disturbances, such as the disturbances generated by changing environmental conditions, deviations of a speaker from the standard language, and deviations of an input sound from the standard sound characteristics.

The following references are presented for further background information:

[1] A. Sankar and C-H. Lee, "A maximum likelihood approach to stochastic matching for robust speech recognition", *IEEE Trans. On Speech and Audio Processing*, vol. 4, pp. 190-202, May 1996.

[2] R. C. Rose, E. M. Hoftsetter and D. A. Reynolds, "Integrated models of signal and background with application to speaker identification in noise", *IEEE Transactions on Speech and Audio Processing*, vol. 2, no. 2, pp. 245-257, April 1994.

[3] Hui Jiang and Li Deng, "A robust compensation strategy for extraneous acoustic variations in spontaneous speech recognition", *IEEE Transactions on Speech and Audio Processing*, vol. 10, no. 1, pp. 9-17, January 2002.

[4] J. McDonough, T. Schaaf, and A. Waibel, "On maximum mutual information speaker-adapted training", *ICAASP* 2002, vol. 1, pp. 601-604, 2002.

[5] Bowen Zhou and J. Hansen, "Rapid speaker adaptation using multi-stream structural maximum likelihood eigenspace mapping", *ICASSP* 2002, vol. 4, pp. 4166-4169, 2002.

[6] J.-T. Chien, "Online unsupervised learning of hidden Markov models for adaptive speech recognition", *IEEE Pro-* ceedings on Vision, Image and Signal Processing, vol. 148, no. 5, pp. 315-324, October 2001.

[7] Shaojun Wang and Yunxin Zhao, "Online Bayesian tree-structured transformation of HMMs with optimal model selection for speaker adaptation", *IEEE Transactions on Speech and Audio Processing*, vol. 9, no. 6, September 2001.

SUMMARY

The present invention provides a system for fast on-line adaptation of acoustic training models for robust automatic audio recognition, the system comprising: a computer system including a processor and a memory coupled with the processor. The computer system further comprises an input coupled with the processor for receiving a series of acoustic input signals from a microphone or from an audio recording medium, and an output coupled with the processor for outputting a recognized sound sequence or a recognized speech sentence. Furthermore, the computer system comprises means residing in its processor and memory for: performing front-end processing on an acoustic input signal; performing recognition on the processed acoustic input signal using a current list of acoustic training models; performing adaptation on the acoustic training models used to recognize the processed acoustic input signal; modifying the current list of acoustic training models to include the adapted acoustic training models; performing recognition and adaptation iteratively until the acoustic score ceases to improve; and choosing the best hypothesis produced by the means for recognition to be outputted as the recognized words, whereby the means for adapting the chosen acoustic training models enables the system to robustly recognize in real time the acoustic input signal in the presence of changing environments, and in a computationally efficient manner.

Moreover, the means for performing front-end processing generates MEL frequency cepstral features that are representative of the acoustic input signal. Then, the means for performing recognition determines at least one best hypothesis and its associated acoustic training models and associated probabilities by using these MEL frequency cepstral features, and a current list of acoustic training models, where the plurality of acoustic training models in the current list are dependent on a speaker or on the environmental conditions initially used to generate the acoustic training models. Once at least one best hypothesis corresponding to the acoustic input signal has been found, the system computes a pre-adaptation acoustic score by recognizing the utterance using the associated acoustic training models used by the means for performing recognition to produce the best hypothesis. Then, the means for performing adaptation chooses a subset of these associated acoustic training models from the recognizer, in order to adapt them to the current environmental conditions, to the deviation of a speaker from the standard language, or to the deviation of a sound from the standard sound characteristics. After adapting the chosen associated acoustic training models, the system computes a post-adaptation acoustic score by recognizing the utterance using the adapted associated acoustic training models provided by the means for performing adaptation, and compares the pre-adaptation acoustic score with the post-adaptation acoustic score to check for improvement. If the acoustic score improves by recognizing the acoustic input signal after adapting the associated acoustic training models, then the adapted associated acoustic training models are included into the current list of acoustic training models used by the means for performing recognition. Furthermore, the system iteratively performs the means for performing recognition and adaptation, the means for computing an acoustic score using the adapted associated acoustic training models, and the means for modifying the current list of acoustic training models to include the adapted acoustic training models, until the acoustic score ceases to improve.

In a further embodiment, the acoustic training models are stored by grouping together the acoustic training models representative of a speech phoneme, and by grouping together the acoustic training models representative of an individual sound, thus forming clusters of models, wherein each cluster of models representative of a speech phoneme, or of an individual sound, has an outer layer. The center of a cluster of models contains all the average samples of the particular phoneme being represented, while the outer layer of the cluster contains the unexpected representations of the particular phoneme, which deviate from the majority of the samples either because they contain noise or because the pronunciation of the phoneme deviates from the standard pronunciation. Thus, only the outer layers of the cluster of models for a phoneme are chosen to be part of the sub-set of acoustic training models used by the recognizer means, since these are the phonemes which are under-represented in the data base and thus are harder to recognize. Therefore, the means for choosing acoustic training models of the present invention use an Euclidean distance measure to select only the acoustic training models located on the outer layer of each cluster.

Furthermore, since each acoustic training model is formed by a set of mixture components, the embodiment of the present invention speeds up the calculation of the adapted training models by performing adaptation only on a sub-set of mixture components for each chosen acoustic training model, in order to allow the system to perform in real time and in a computationally efficient manner. Thus, since each individual mixture component from an acoustic training model has a probability associated with it, the embodiment of the present invention selects the sub-set of mixture components based on a fixed probability threshold value set a priori by the user, wherein only the mixture components selected for adaptation are the mixture components whose associated probability is greater than or equal to the chosen probability threshold.

By performing adaptation utterance by utterance and only on a chosen sub-set of training models and only for a chosen sub-set of the mixture components for each chosen training model, the present embodiment of the invention quickly adapts the sound recognition system in real time to the current environmental conditions, and to the current acoustic input deviations from the standard sound models or the standard speaker models.

In another embodiment of the present invention, the means for adapting the chosen associated acoustic training models performs Estimation Maximization over the chosen subsets of associated acoustic training models and chosen subsets of mixture components, in order to find the distortion parameters that model most closely the current environmental conditions, the present non-standard speaker acoustic model, or the present distorted sound acoustic model. These distortion parameters consist of a bias mean value and a bias standard deviation value, that represent the differences between the mean and the standard deviation of the associated acoustic training models, and the mean and the standard deviation of the acoustic training models representing the current sound disturbances.

In order to perform Estimation Maximization to find the distortion parameters, the embodiment of the invention initializes the distortion parameters to an initial bias mean value and an initial bias standard deviation value, and computes an auxiliary function based on these initial distortion parameters values. Then, the system iteratively performs the Estimation Maximization of the auxiliary function over the chosen subsets of associated acoustic training models and mixture components. The result of the Estimation Maximization act yields the distortion parameters that model most closely the current environmental conditions.

Once the distortion parameters are found, the means for performing adaptation adds the distortion parameters to the previously chosen associated acoustic training models, thus creating new adapted acoustic training models that are robust with respect to the current environment conditions and to the current acoustic input signal. By using the adapted training models to recognize the acoustic input signal, the present embodiment of the invention is able to obtain higher recognition accuracy than a system using only the standard training models without adapting them to the current environment or the current acoustic input signal model.

In yet another embodiment, the means for performing recognition and adaptation computes the "pre-adaptation" and "post-adaptation" acoustic scores by determining the best hypothesis from the recognizer, using either the associated acoustic training models or the adapted acoustic training models correspondingly. Once the best hypothesis and its associated probabilities are found, the acoustic score is determined by combining a proper subset of the resulting associated probabilities from the best hypothesis, wherein this proper subset of probabilities comprises the probability associated with a unit of sound and a set of probabilities associated with that unit of sound transitioning to several other units of sound.

In a further embodiment of the present invention, the means for performing adaptation outputs the adapted acoustic training models that yielded the best hypothesis into a database of acoustic training models. This database of acoustic training models will grow each time a new adapted acoustic training model generates the best hypothesis results possible for a particular scenario, such as changing environmental conditions, deviation of a speaker from the standard language, or deviation of a sound from the standard sound characteristics. This embodiment of the present invention creates updated databases of acoustic training models that can be tailored for non-standard speaker recognition, suitable for speech/speaker recognition applications comprising INS surveillance, national security surveillance, airport surveillance, automatic-speech telephone queries, air travel reservations, voice activated command and control systems, and automatic translation.

In still a further embodiment, the present invention performs robust automatic sound recognition by adapting the chosen associated acoustic training models to the present environment by applying the projection in the model space. However, unlike the rest of the adaptation techniques developed so far, the present invention embodiment uses a projection in the model space that is applicable for derivatives of cepstral coefficients and that does not require specialized adaptation training data for every different environmental condition, and hence is a very practical and robust approach to sound/speech recognition.

Instead of gathering multiple acoustic training models, as needed for the rest of the adaptation techniques, for every environmental condition possible, or for every possible non-standard speaker pronunciation, or for every possible deviation of a sound from the standard sound characteristics, the present embodiment adapts the acoustic training models available in any sound recognition system which represent standard environments, standard speaker characteristics, and standard sound characteristics. By adapting the standard acoustic training models, this embodiment creates new adapted training models which are representative of the current sound disturbances generated by the changing environmental conditions, or the deviation of a speaker from the standard language, or the deviation of a sound from the standard sound characteristics.

Furthermore, to achieve near real time speech recognition, the adaptation process should not take much time. Therefore, for quick adaptation, the current embodiment of the invention adapts the training models utterance by utterance, and selectively chooses a subset of the associated acoustic training models and a subset of mixture components of the chosen associated acoustic training models that need to be projected to match the testing environment.

The features of the above embodiments may be combined in many ways to produce a great variety of specific embodiments, as will be appreciated by those skilled in the art. Furthermore, the means which comprise the apparatus are analogous to the means present in computer program product embodiments and to the acts in the method embodiment.

BRIEF DESCRIPTION OF THE DRAWINGS

The objects, features, aspects, and advantages of the present invention will become better understood from the following detailed descriptions of the preferred embodiment of the invention in conjunction with reference to the following appended claims, and accompanying drawings where:

DETAILED DESCRIPTION

Figure 1:
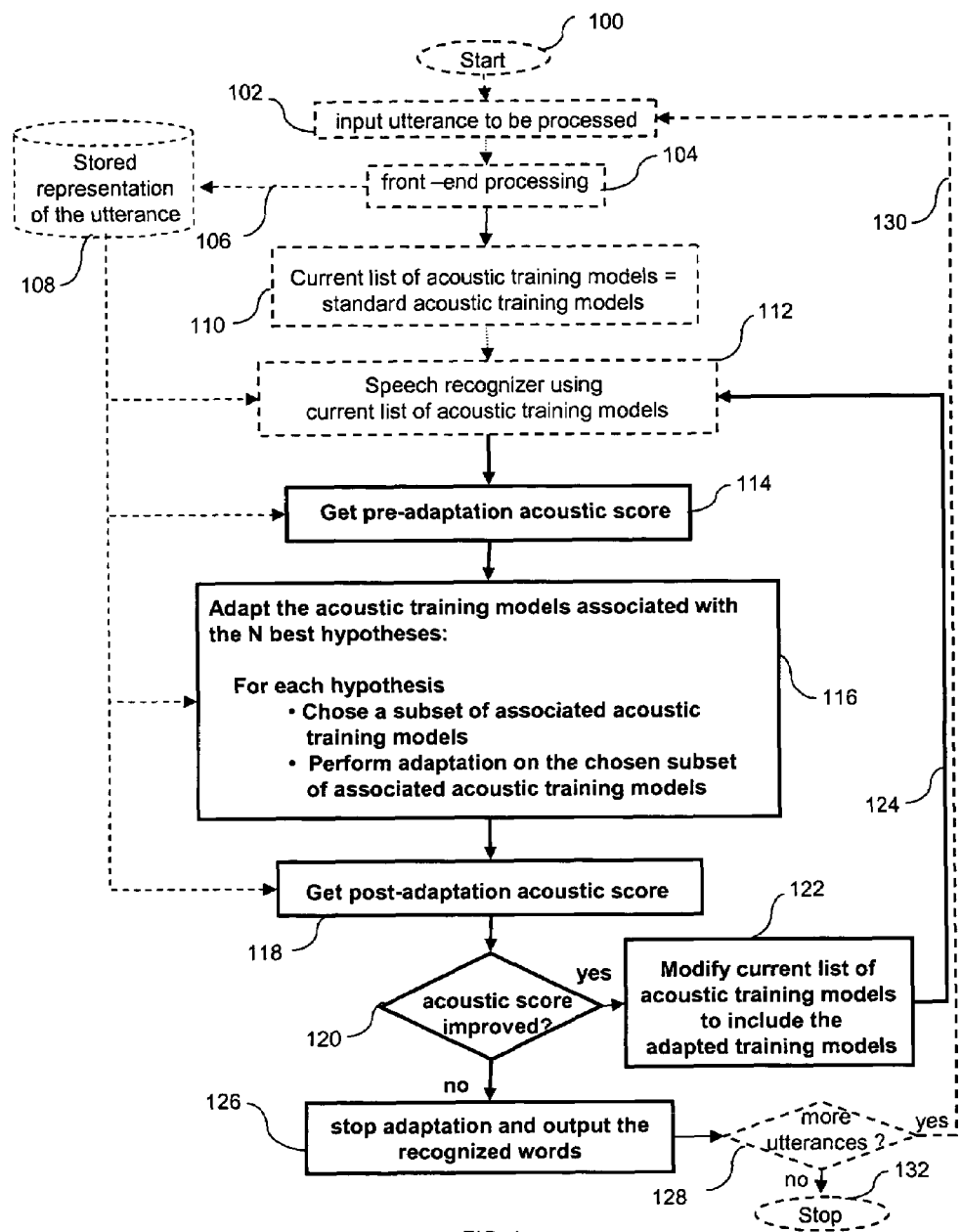
FIG. 1 is a flow chart depicting operating acts/means/modules according to present invention.

The present invention relates to the fields of signal processing, speech processing, machine learning, and probabilistic methods. More specifically the invention pertains to fast on-line adaptation of acoustic training models to achieve robust automatic speech recognition (RASR) with respect to changing background environments and to non-standard speakers, and it may be tailored to a variety of other applications such as automatic sound recognition. The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that, unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, a brief introduction is provided in the form of a narrative description of the present invention to give a conceptual understanding prior to developing the specific details. Finally, a detailed description of the elements is provided in order to enable the reader to make and use the various embodiments of the invention without involving extensive experimentation.

(1) Glossary

Before describing the specific details of the present invention, it is useful to provide a centralized location for various terms used herein and in the claims. A definition has been included for these various terms. However, the definition provided should not be considered limiting to the extent that the terms are known in the art. These definitions are provided to assist in the understanding of the present invention.

Acoustic Score—The term "acoustic score," as used herein, is a measurement reflecting how well the pattern matching stage, using a set of acoustic training models, is able to recognize a unit of sound inputted into the system. The acoustic score is determined by combining the probabilities obtained from the pattern matching stage, which are associated with the best hypothesis results. The resulting probabilities associated with the best hypothesis used to determine the acoustic score comprise the probability associated with a unit of sound, and a set of probabilities associated with that unit of sound transitioning to several other units of sound.

Acoustic Training Models—The term "acoustic training models," as used herein, corresponds to the models representative of a phoneme, or a unit of sound, which are built from the acoustic parameters and features extracted from a training data set which contains a plurality of samples of the particular phoneme, or sound, being modeled.

Best hypothesis—The term "best hypothesis," as used herein, corresponds to either the sentence hypothesis with the highest likelihood measure when the input is speech, or the sound hypothesis with the highest likelihood measure when the input utterance is a sound.

Dialect—The term "dialect," as used herein, is a regional or social variety of a language distinguished by pronunciation, grammar, or vocabulary, especially a variety of speech differing from the standard language or speech pattern of the culture in which it exists. An imperfect use of the standard language by those whom another language is native.

Distortion Parameters—The term "distortion parameters," as used herein, corresponds to the estimated difference between the mean and variance of the standard acoustic training model, and the mean and variance of the actual acoustic training model representative of the current environmental conditions. In order to adapt the standard acoustic training models, stored on the audio recognizer's memory, to the current environmental conditions, the estimated distortion parameter for the mean is added to the mean of the standard acoustic training model, and the estimated distortion parameter for the variance is added to the variance of the standard acoustic training model.

Front-end processing—The term "front-end processing," as used herein, refers to a set of algorithms used to segment the acoustic input signal into time segments, and then compute the MEL frequency cepstral coefficients for each particular time segment.

Gaussian mixture models—Mixture models, as used herein, are a type of probability density model which comprise a number of component functions, usually Gaussian, and are used to model the underlined probability density function of the data. Each Gaussian component function has a mean and a variance associated with it. These component functions, are combined to provide a multimodal density.

Language Model—The term "language model," as used herein, provides the probability of a word occurring followed by a string of words. If the probability of a word followed by one word is used, then that language model is called a bigram model; and if the probability of a word followed by two previous words is used, then the language model is called a trigram model.

Means—The term "means" when used as a noun, with respect to this invention, generally indicates a set of operations to be performed on a computer, and may represent pieces of a whole program or individual, separable, software (or hardware) modules. Non-limiting examples of "means" include computer program code (source or object code) and "hard-coded" electronics. The "means" may be stored in the memory of a computer or on a computer readable medium. In some cases, however, the term "means" refers to a class of device used to perform an operation, and thus the applicant intends to encompass within the language any structure presently existing or developed in the future that performs the same operation.

MFCC—An acronym for "MEL-Frequency Cepstral Coefficients." The MEL-frequency scale is a nonlinear frequency representation of acoustic signals, which is obtained by taking the logarithm of the Fourier transform of the sound signals, or equivalently by taking the logarithm of the Z-transform of the sound signals. Psychophysical studies have shown that human perception of the frequency content of sounds does not follow a linear scale. Therefore, the "MFCC," as used herein, are used to mimic the human perception of the frequency content of sounds by measuring the subjective pitch of acoustic signals in a nonlinear fashion. In speech recognition technology, MEL Cepstrum Coefficients (MFCC) are well known and their behavior have lead to high performance of speech recognition systems.

Nonstandard Speaker—The term "nonstandard speaker," as used herein, indicates a speaker whose pronunciation of words and sentences diverges from the standard language pronunciation. Examples of "nonstandard speakers" comprise native speakers from a country who have a regional accent, speakers from a different country who have a foreign accent, and native speakers from the country who have a speech impediment.

On-line—The term "on-line," as used herein, is a standard term used to denote "under the control of a central computer," as in a manufacturing process or an experiment. On-line also means to be connected to a computer or computer network, or to be accessible via a computer or computer network.

Phoneme—The term "phoneme", as used herein, denotes the smallest phonetic unit in a language that is capable of conveying a distinction in meaning, as the m of mat and the b of bat in English. Thus, the term "phoneme" denotes a unit of sound.

Phoneme hypothesis—The term "phoneme hypothesis," as used herein, is a tentative result generated by the pattern matching act, which consists of two elements: a particular phoneme being offered as the recognized acoustic input, and the confidence level of the recognizer or the likelihood that the particular phoneme actually is the input sound.

Phonotactic Models—The term "phonotactic model," as used herein, provides the probability of a phoneme occurring followed by a string of phonemes.

RASR—An acronym for "Robust Automatic Speech Recognition."

Real-time—The term real-time, as used herein, is a standard term used to relate to computer systems that update information, or perform a task, at or nearly at the same rate as they receive data, enabling them to direct or control a process such as recognizing the words uttered by a speaker at or nearly at the same rate as the speaker talks.

Recognizer Likelihood measure—The "likelihood measure" for each hypothesis, or sound hypothesis, as used herein, consists of a combination of four elements which are: the probability associated with a phoneme or unit of sound, the set of probabilities associated with that phoneme or unit of sound transitioning to several other phonemes or units of sound, the probability associated with a word, and the set of probabilities associated with that word transitioning to several other words. The Recognizer likelihood measure, as used herein, gives a probability of how likely it is for the acoustic output signal of the recognizer to match with the actual acoustic input signal.

Robust—The term "robust", as used herein, indicates that the system is tolerant to uncertainties such as those associated with sound disturbances selected from a group consisting of changing environmental conditions, deviation of a speaker from the standard language, deviation of a sound from the standard sound characteristics, introduction of background noise, and signal interference.

Sentence hypothesis—The term "sentence hypothesis," as used herein, is a tentative result generated by the sentence generator stage of the recognition process, which consist of two elements: a particular sentence being offered as the recognized acoustic input, and the confidence level of the recognizer or the likelihood that the particular sentence actually is the input sentence.

Sound hypothesis—The term "sound hypothesis," as used herein, is a tentative result generated by the recognition process, which consists of two elements: a particular sound being offered as the recognized acoustic input, and the confidence level of the recognizer or the likelihood that the particular sound actually is the input sound.

Standard Language—The term "standard language," as used herein, corresponds to the pronunciation of the official language of a country set as the standard pronunciation by the FCC (Federal Communications Commission) or equivalent agency in such country. It is the standard language pronunciation that the newscasters and reporters use to broadcast the news over the communication's medium, such as radio and television.

Utterance—Depending on which type of acoustic signal is inputted into the present invention, the term "utterance," as used herein, corresponds to a complete sentence uttered by a speaker when the acoustic input corresponds to speech signals, or an "utterance" corresponds to a sequence of sounds separated from other sounds by a gap of silence when the acoustic input corresponds to a sequence of sounds other than speech.

Word hypothesis—The term "word hypothesis," as used herein, is a tentative result generated by the word generator stage of the recognition process, which consist of two elements: a particular word being offered as the recognized acoustic input, and the confidence level of the recognizer or the likelihood that the particular word actually is the input word.

(2) Overview

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, elements, files, and coefficients.

It is to be understood, that all of these, and similar terms, are to be associated with the appropriate physical quantities, and are merely convenient labels applied to these quantities. Unless specifically stated otherwise as apparent from the following discussions, it is appreciated that throughout the present disclosure, discussions utilizing terms such as "processing," "calculating," "determining," "inputting," "outputting," or "displaying" refer to the action and processes of a computer system, or similar electronic device that manipulates and transforms data represented as physical (e.g. electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

The present invention, in one embodiment, provides a system for fast on-line adaptation of acoustic training models to achieve robust automatic audio recognition in the presence of sound disturbances, such as the disturbances created by changing environmental conditions, deviation of a speaker's accent from the standard language, and deviation of a sound from the standard sound characteristics. The system includes a model-adaptation portion designed to quickly adapt standard acoustic training models (available on any audio recognition system) to the current sound disturbances by incorporating distortion parameters into the available standard acoustic training models, thus producing a set of adapted acoustic training models. Since the distortion parameters found by the model-adaptation algorithm are representative of the changing environmental conditions or the speaker's accent, the adapted acoustic training models allow for more accurate and efficient recognition of on-line distorted sounds or words spoken with different accents, in the presence of randomly changing environmental conditions.

Once the adapted acoustic training models are found, the system determines if the recognition of the acoustic input signal is improved by the inclusion of the adapted acoustic training models into the standard acoustic training models used by the audio recognition algorithm. This is accomplished by first recognizing the acoustic input signal using only the standard acoustic training models, and then computing the pre-adaptation acoustic score. Secondly, the acoustic input signal is recognized using the adapted acoustic training models, and then the post-adaptation acoustic score is computed. Finally, the system compares the pre-adaptation acoustic score with the post-adaptation acoustic score. In the case when the acoustic score improves by performing adaptation, the system adds the adapted acoustic training models to a current list of acoustic training models that is used by the audio recognition algorithm to recognize audio signals.

In addition, the system continues to perform adaptation and recognition iteratively until the acoustic score ceases to improve. Once the acoustic score stops improving, the system chooses the best hypothesis presented by the audio recognition algorithm as the recognized words or sounds, and then provides the user with these recognized words or sounds. By adapting standard acoustic training models already available to the new environment, the system does not need separate adaptation training data. Therefore, instead of gathering multiple acoustic training models for every environmental condition possible, or for every possible nonstandard speaker pronunciation, or for every possible deviation of a sound from the standard sound characteristics, the present invention adapts the acoustic training models available in any sound recognition system, which represent standard environments, standard speaker characteristics, and standard sound characteristics.

A flow chart depicting the operating acts of the present invention is shown in FIG. 1. The blocks in the diagram represent the functionality of the apparatus of the present invention. After starting 100, an operation of receiving an acoustic utterance 102 is performed in which an acoustic utterance is inputted into the system by an audio inputting means comprised of, but not limited to, a microphone, a radio, a cellular wireless telephone, a telephone receiver, an external computer connected to the system, an internet connection, or an audio recording medium used to gather data in random environments and from non-standard speakers, such as an audio Compact Disk (CD), a cassette tape, a Digital Versatile Disk/Digital Video Disk (DVD), a video cassette, or a Long Play (LP) record. Other, non-limiting examples of computer readable media include hard disks, read only memory (ROM), and flash-type memories. Then, the present invention performs front-end processing (operation 104) on the acoustic input utterance and generates MEL frequency cepstral features (signal 106) that represent the acoustic input signal in the cepstral space. These MEL frequency cepstral features (signal 106) are then stored in a temporary memory storage location (box 108) for the current utterance representation which is constantly accessed by the speech recognition algorithm (operation 112), the model adaptation algorithm (operation 116), and the acoustic score algorithm which is used to compute the pre-adaptation acoustic score (operation 114) and the post-adaptation acoustic score (operation 118). The current MEL frequency cesptral representation of the utterance (signal 106) will remain in the temporary memory storage location (box 108) until the system finishes recognizing the current utterance, and a new utterance is inputted into the system (operation 130). At that point, the system will clear the contents of the temporary memory storage location (box 108) deleting the old utterance representation, and the system will compute the new current MEL frequency cesptral representation of the utterance and will store it in the temporary memory storage location (box 108).

After extracting the MEL frequency cepstral features of the current input utterance (signal 106), the system initializes a current list of acoustic training models (operation 110) in such manner that the current list of acoustic training models comprises a plurality of standard acoustic training models available on any audio recognition system. These standard acoustic training models are dependent on the particular speaker or the particular environmental conditions in which the standard acoustic training models were initially obtained. Then, the system evokes a speech recognizer (operation 112) using the current list of acoustic training models and the stored representation of the utterance (box 108). The speech recognizer provides the system with a set of hypotheses corresponding to the input utterance and a set of likelihood measures, wherein each likelihood measure is associated with a hypothesis in the set of hypotheses from the recognizer. Once the input utterance is recognized, the system gets the pre-adaptation acoustic score (operation 114) corresponding to the best hypothesis (hypothesis with the highest likelihood measure associated with it) provided by the speech recognizer (operation 112).

Then, the system proceeds to adapt the acoustic training models associated with the "N" best hypotheses (operation 116), where "N" is an arbitrary number of hypothesis that the user chooses a priori to adapt. Furthermore, in order to speed up the adaptation procedure for each chosen hypothesis, the system chooses to adapt only a subset of the standard associated acoustic training models that were used by the recognizer to produce the particular chosen hypothesis. Once the adapted acoustic training models are found, the system gets the post-adaptation acoustic score (operation 118) obtained by recognizing the input utterance using the adapted acoustic training models instead of the standard acoustic training models. The system then compares the pre-adaptation acoustic score and the post-adaptation acoustic score (box 120). If the system detects an improvement on the acoustic score after performing adaptation, the system modifies the current list of acoustic training models to include the adapted training models (operation 122), and then the system goes back 124 to perform recognition (operation 112) and adaptation (operation 116) iteratively until the acoustic score ceases to improve.

If the acoustic score ceases to improve, the system stops the adaptation procedure and outputs the recognized words (operation 126), where the outputted recognized words are the hypothesis provided by the speech recognizer with the highest likelihood measure associated with it. The system then proceeds to check if there are any more utterances that need to be recognized (box 128), and the system either iterates back to input the new utterance to be processed (operation 102) or stops (operation 132) all of the system's processes.

The blocks in the flowchart of FIG. 1 may also be viewed as a series of functional modules and sub-modules, representing either software or hardware modules depending on the particular embodiment. These modules operate within the processor and memory of a general-purpose or special-purpose computer system and may be in the form of software instructions or "hard-coded" electronic circuits.

(3) Physical Embodiments of the Present Invention

The present invention has three principal "physical" embodiments. The first is an apparatus for fast on-line automatic speaker/environment adaptation suitable for speech/speaker recognition in the presence of changing environmental conditions, typically including, but not limited to, a computer system operating software in the form of a "hard coded" instruction set. This apparatus may also be specially constructed, as an application-specific integrated circuit (ASIC), or as a readily reconfigurable device such as a field-programmable gate array (FPGA). The second physical embodiment is a method, typically in the form of software, operated using a data processing system (computer).

The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These (aspects) embodiments will be described in more detail below.

Figure 2:
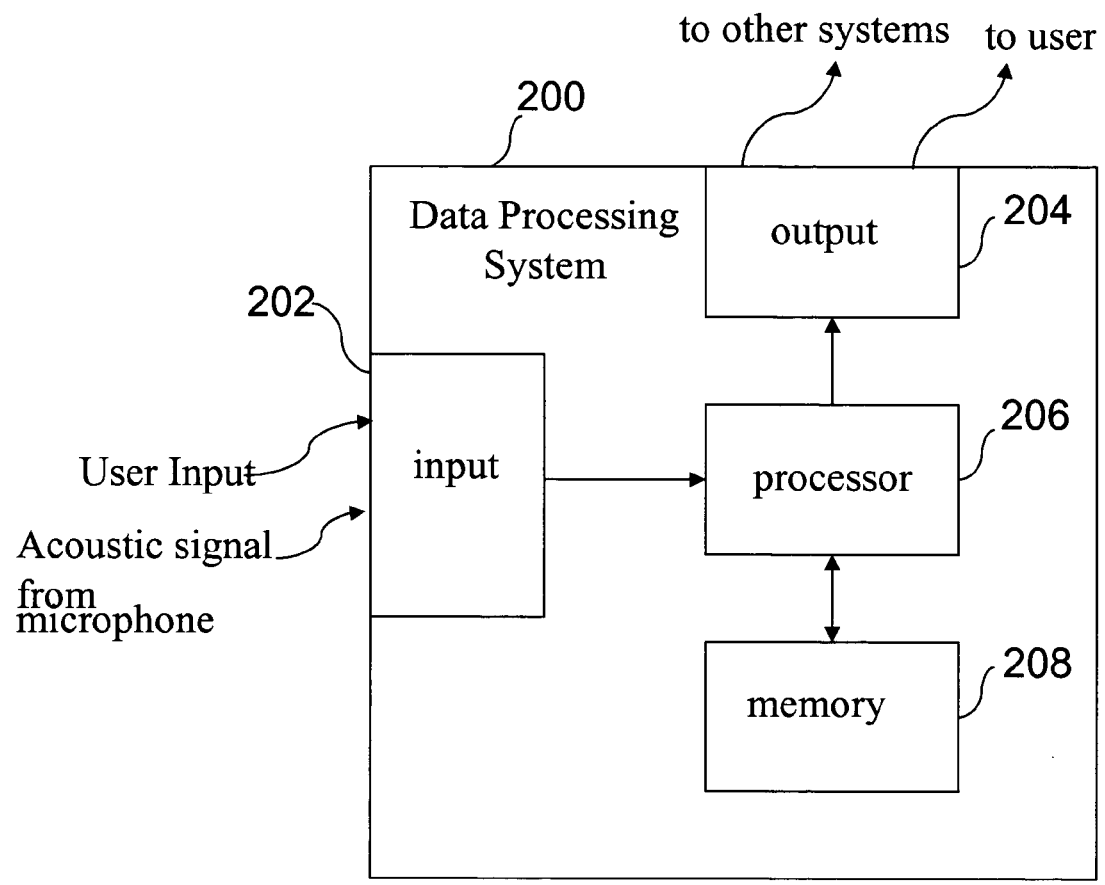
FIG. 2 is a block diagram depicting the components of a computer system used with the present invention.

A block diagram depicting the components of a computer system used in the present invention is provided in FIG. 2. The data processing system 200 comprises an input 202 for receiving acoustic input signals from any inputting means, including but not limited to a microphone, an external computer connected to the system, an internet connection, or any computer readable medium such as a floppy disk, Compact Disk (CD), a Digital Versatile Disk/Digital Video Disk (DVD), and a removable hard drive. The input 202 may also be configured for receiving user input from another input device such as a microphone, keyboard, or a mouse, in order for the user to provide the system with the number "N" of best hypotheses that the user wishes to obtain from the speech recognizer in order to adapt them to the current environment conditions. Note that the input 202 may include multiple "ports" for receiving data and user input, and may also be configured to receive information from remote databases using wired or wireless connections. The output 204 is connected with the processor 206 for providing output to the user, on an audio speaker system but also possible through a video display. Output may also be provided to other devices or other programs, e.g. to other software modules, for use therein, possibly serving as a wired or wireless gateway to external databases or other processing devices. The input 202 and the output 204 are both coupled with a processor 206, which may be a general-purpose computer processor or a specialized processor designed specifically for use with the present invention. The processor 206 is coupled with a memory 208 to permit storage of data and software to be manipulated by commands to the processor.

Figure 3:
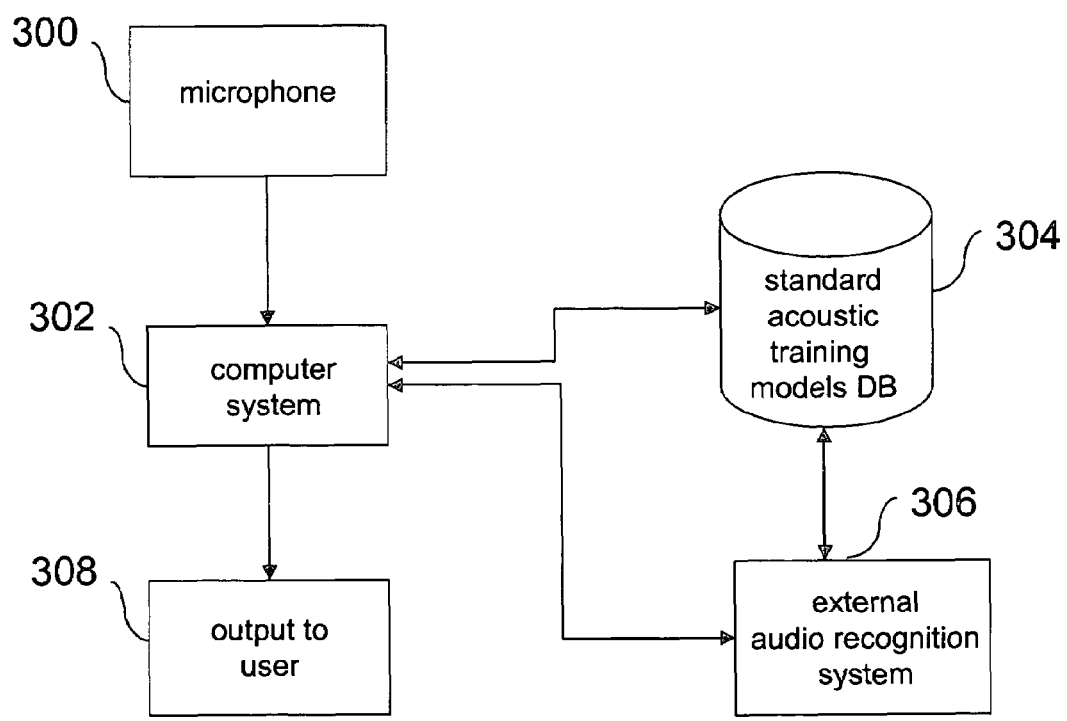
FIG. 3 is a system overview depicting an example embodiment of the present invention, showing one possible configuration of the computer system of FIG. 1 within a larger overall system.

A system overview depicting an example embodiment of the present invention, showing one possible configuration of the computer system of FIG. 1 within a larger overall system is shown in FIG. 3. A microphone 300 provides an acoustic utterance to the computer system 302, where the utterance is spoken by a speaker with a non-standard accent or by a speaker surrounded by changing environmental conditions. A classification database 304 is connected with the computer 302, and contains a set of potential standard acoustic training models to which extracted acoustic training models from the input utterance are matched. Typically, to aid in the robustness of an existing external audio recognition system 306, the computer system 302 is connected to the external audio recognition system 306. Then, the computer system 302 communicates back and forth with the external audio recognition system 306 in order to perform adaptation of the standard acoustic training models to the current sound disturbances, such as the disturbances created by changing environmental conditions, deviation of a speaker's accent from the standard language, and deviation of a sound from the standard sound characteristics. The computer system 302 performs the adaptation acts to adapt the standard acoustic training models stored in the classification database 304 and used by the external audio recognition system 306 to the current sound disturbances, while the external audio recognition system 306 performs the recognition acts needed by the adaptation acts to obtain the best hypotheses, associated acoustic training models, and pre-adaptation and post-adaptation acoustic scores. Once the acoustic score ceases to improve by adapting the acoustic training models, the recognized utterance is outputted to a user through a user output 308 that is connected with the computer system 302. As mentioned, there are a great number of potential configurations that could be substituted for the one presented in FIG. 3. For example, although the classification database 304 and the external audio recognition system 306 are shown as separate from the computer system 302, they need not be. Furthermore, the microphone 300 could also be connected directly to the external audio recognition system 306. As a further example, although the connections between the components are depicted with solid lines representing physical connections, the connections may also be wireless.

Figure 4:
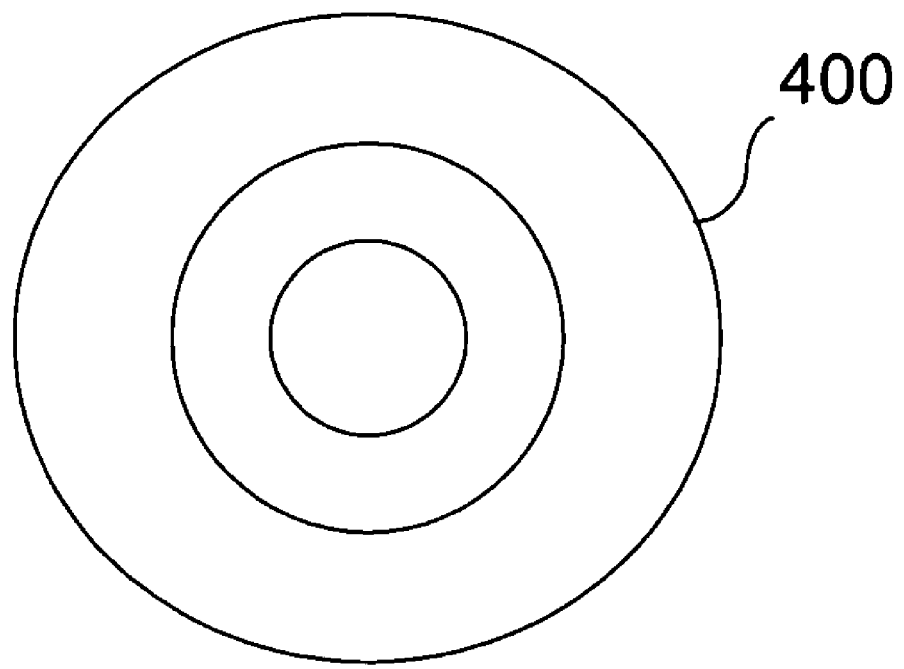
FIG. 4 is an illustrative diagram of a computer program product embodying the present invention.

An illustrative diagram of a computer program product embodying the present invention is depicted in FIG. 4. The computer program product 400 is depicted as an optical disk such as a CD or DVD. However, as mentioned previously, the computer program product generally represents computer readable code stored on any compatible computer readable medium.

(4) Detailed Description of the Elements

Figure 5:
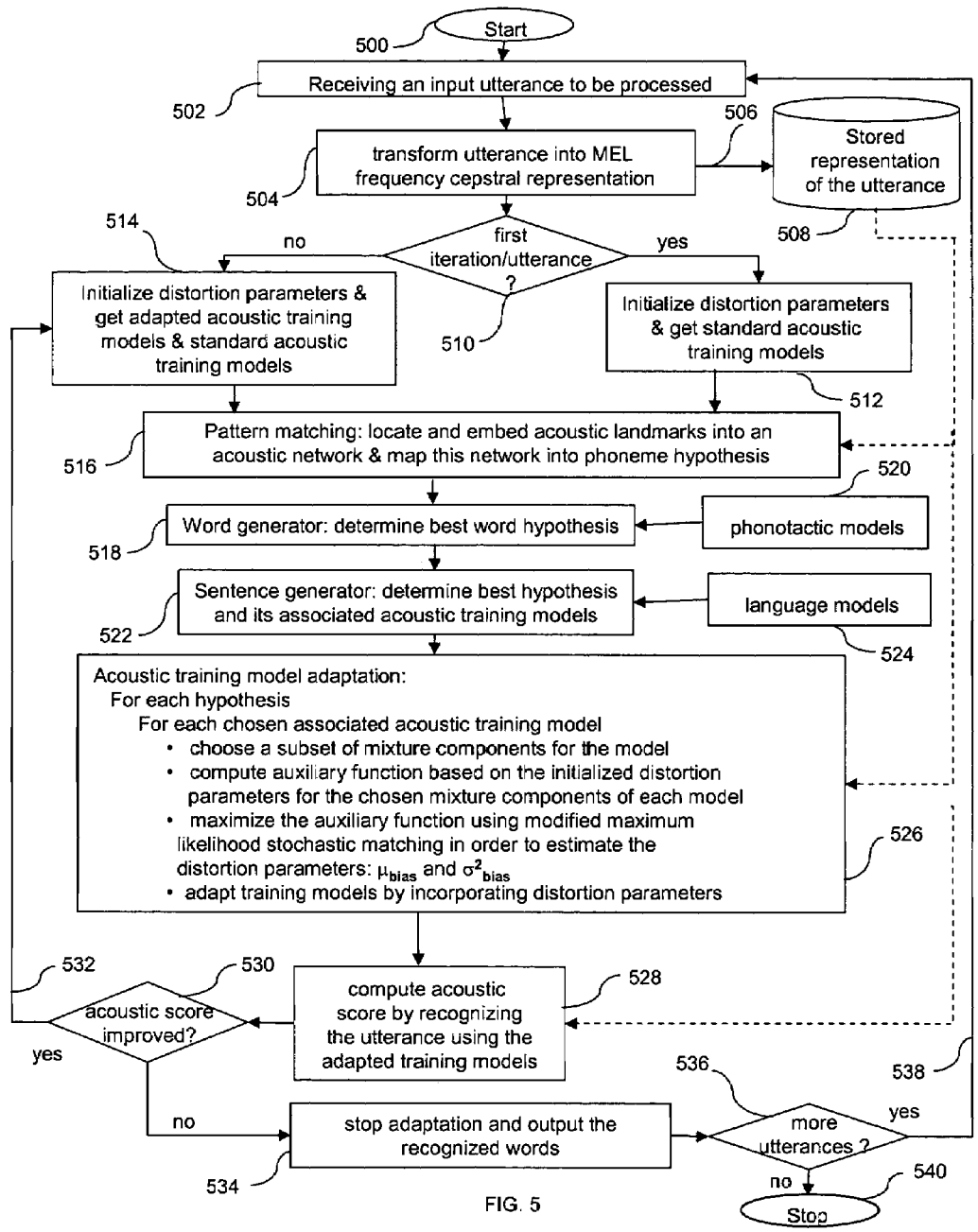
FIG. 5 is a flow chart depicting operating acts/means/modules according to a second embodiment of the present invention.

A detailed description of an embodiment of the present invention, a method for fast on-line adaptation of acoustic training models to achieve robust automatic audio recognition in the presence of sound disturbances, such as the disturbances created by changing environmental conditions, is presented, as set forth schematically in a flow chart shown in FIG. 5. In this detailed embodiment, the blocks in the diagram represent the functionality of the apparatus of the present invention. After starting 500, an operation of receiving an input utterance 502 is performed in which an acoustic utterance is inputted into the system by an audio inputting means, and where the operation 502 corresponds to the previously described operation 102. Then, the system performs an operation 504 of transforming the input utterance into a MEL frequency cepstral representation, and stores this MEL frequency cepstral representation 506 in a temporary memory storage location 508 which is constantly accessed by the "pattern matching" portion 516 of the speech recognition algorithm, the "acoustic training model adaptation" portion 526 of the system, and the "acoustic score" portion 528 of the system which is used to compute the post-adaptation acoustic score, where the terms 504, 508, 526, and 528 correspond to the previously described terms 104, 108, 116, and 118, respectively.

Once the system has obtained the MEL frequency cesptral representation of the input utterance 504, the system must determine 510 whether this is the first attempt by the system to recognize the utterance using only standard acoustic training models or if the system has iterated back to recognize the utterance using adapted acoustic training models. In the case when the system makes the first attempt to recognize the utterance, the system initializes the distortion parameters to an initial value and gets the standard acoustic training models (operation 512) which will be used by the "pattern matching" portion 516 of the speech recognizer. The distortion parameters for this embodiment of the invention consist of a bias mean value and a bias standard deviation value, representing differences between a mean and standard deviation of the standard acoustic training models, and a mean and standard deviation of the acoustic training models representing the current sound disturbances. Therefore, the first time the system attempts to recognize an utterance, the "pattern matching" portion 516 of the speech recognizer uses standard acoustic training models, available on any speech recognizer, which are dependent on the particular speaker or the particular environmental conditions in which the standard acoustic training models were initially obtained. In the case when the system has already adapted previously chosen associated acoustic training models to the current environmental conditions, the system initializes the distortion parameters to an initial value and provides the previously adapted acoustic training models along with the standard acoustic training models (operation 514) to the "pattern matching" portion 516 of the speech recognizer. In this case, the distortion parameters consist of a bias mean value and a bias standard deviation value, representing differences between a mean and standard deviation of the previously adapted acoustic training models, and a mean and standard deviation of the acoustic training models representing the current sound disturbances. Then the "pattern matching" portion 516 locates acoustic landmarks from the MEL frequency cesptral representation of the utterance, embeds the acoustic landmarks into an acoustic network, and maps this acoustic network into a phoneme hypothesis by using a set of automatically determined acoustic parameters and the provided acoustic training models in conjunction with pattern recognition algorithms.

Next, the "word generator" portion 518 determines at least one best word hypothesis by comparing the phoneme hypothesis provided by the "pattern matching" portion with phonotactic models 520 stored in the speech recognizer, wherein the phonotactic models 520 are independent from a speaker or from any environmental conditions. In turn, the "sentence generator" portion 522 determines at least one best hypothesis and its associated acoustic training models by comparing the best word hypothesis provided by the "word generator" portion with language models 524 stored in the speech recognizer, wherein the language models 524 are independent from a speaker or from any environmental conditions.

Once the best hypothesis for the input utterance and its associated acoustic training models have been found by the "sentence generator" portion 522, the system accesses the "acoustic training model adaptation" portion 526, where for each best hypothesis provided by the "sentence generator" the system chooses only a subset of the associated acoustic training models to be adapted in order to speed up the adaptation process. Thus, the system chooses a subset of the associated acoustic training models by selecting only the associated training models located on the outer layer of the cluster formed by the grouping of the associated training models. Then, in order to further speed up the adaptation procedure, the system chooses to adapt only a subset of mixture components for each of the previously chosen associated acoustic training models by selecting only the mixture components whose associated probability is at least equal to a fixed probability threshold value set a priori by a user. Next, the system computes an auxiliary function based on the previously initialized distortion parameters for the chosen mixture components of each of the chosen associated acoustic training models. Once the auxiliary function is built, this embodiment of the invention proceeds to maximize the auxiliary function using modified maximum likelihood stochastic matching. The estimation maximization of the auxiliary function over the chosen subsets of associated acoustic training models and mixture components results in the estimation of new distortion parameters $\mu_{bias}$ and $\sigma^2_{bias}$. These new distortion parameters $\mu_{bias}$ and $\sigma^2_{bias}$ approximate the differences between the mean and standard deviation of the previously adapted acoustic training models, and the mean and standard deviation of the acoustic training models representing the current sound disturbances, respectively. Then the system adapts the associated acoustic training models provided by the sentence generator by adding the distortion parameters $\mu_{bias}$ and $\sigma^2_{bias}$ to the mean and standard deviation of the associated acoustic training models, respectively, thus generating new adapted acoustic training models.

Next, the system computes the post-adaptation acoustic score 528 by recognizing the utterance using the newly adapted acoustic training models. The system then compares 530 the post-adaptation acoustic score and the pre-adaptation acoustic score obtained by recognizing the utterance using the associated acoustic training models before adaptation. If the system detects an improvement on the acoustic score after performing adaptation, the system iterates back 532 to add the newly adapted acoustic training models 514 to the list of standard acoustic training models used by the "pattern matching" portion 516 to recognize the utterance, and then the system performs recognition (operations 516, 518, and 522) and adaptation 526 iteratively until the acoustic score ceases to improve.

If the acoustic score ceases to improve, the system stops the adaptation procedure and outputs the recognized words 534, where the outputted recognized words are the hypothesis provided by the "sentence generator" portion 522 of the speech recognizer with the highest likelihood measure associated with it. The system then proceeds to check if there are any more utterances that need to be recognized 536, and the system either iterates back to input the new utterance to be processed 538, or stops 540 all of the system's processes.

The detailed embodiments of the various features discussed previously in the Overview section will be presented below.

Figure 6:
FIG. 6 is a table of results illustrating the reduction of speech recognition accuracy during the presence of background noise.

Spoken dialogue information retrieval applications are becoming popular for mobile users in automobiles, on cellular telephones, etc. Due to the typical presence of background noise and other interfering signals when used in mobile systems, speech recognition accuracy reduces significantly if it is not trained explicitly using the specific noisy speech signal for each environment. An example of such degradation on speech recognition accuracy is illustrated in FIG. 6, where the speech recognition accuracy at word level for different noise levels is tabulated. This particular experiment utilizes 1831 clean test speech utterances from 1831 speakers, a continuous speech recognizer, and in-vehicle noise recorded from a Volvo car moving at a speed of 134 kmph on an asphalt road. The in-vehicle noise was added to the clean speech signals at different signal-to-noise ratios (SNR). From Table 600 in FIG. 6 it can be seen that the reduction in speech recognition accuracy is very significant when in-vehicle noise is combined with clean speech, especially in the case of 0 dB Signal-to-Noise-Ratio (SNR) which yields a 45.2% recognition accuracy, as opposed to the clean speech case with no in-vehicle noise which yields a 91.9% recognition accuracy.

However, since it is very hard to know a priori the environment in which mobile platforms are going to be used, the number of interfering signals that are present, and who (i.e., standard speaker or non-standard speaker, and if non-standard speaker which mother tongue) would use the system, it is not practical to train recognizers for the appropriate range of typical noisy environments and/or non-native speakers. Therefore, it is imperative that the Automatic Speech Recognition (ASR) systems be robust to mismatches in training and testing environments. The mismatches, in general, correspond to: variations in background acoustic environment; non-standard speakers i.e., speakers whose mother tongue is different from the language for which an ASR system is trained for; and channel deviations. Robust Automatic Speech Recognition RASR is an active research area for a decade. Several techniques have been developed to address the robustness issues in ASR. These techniques can be broadly classified into front end processing and speaker/environment adaptation, as described in "A maximum likelihood approach to stochastic matching for robust speech recognition", *IEEE Trans. On Speech and Audio Processing*, vol. 4, pp. 190-202, May 1996, by A. Sankar, et al.

Figure 7:
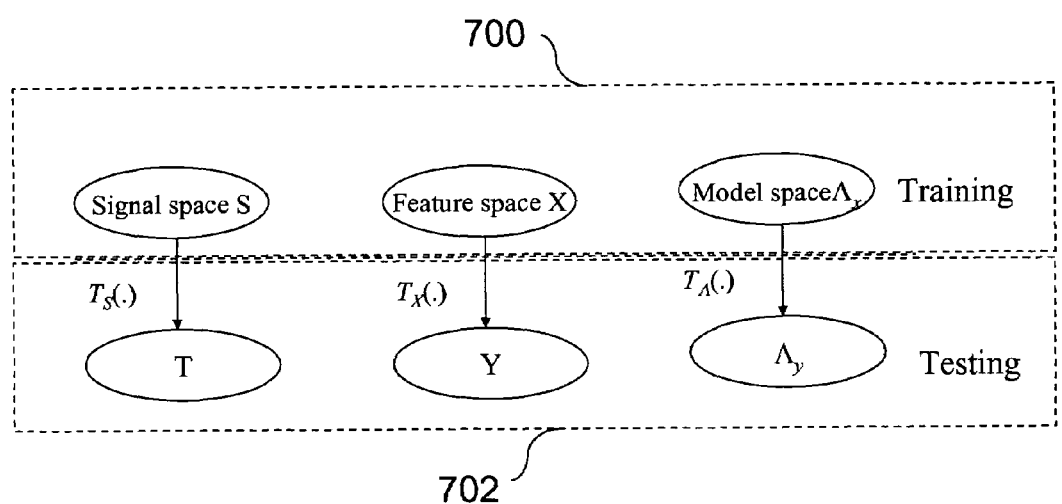
FIG. 7 is an illustrative diagram of a conceptual description of a speaker/environment adaptation technique.

The present invention corresponds to the class of speaker/environment adaptation. For adaptation several techniques have been developed as discussed in "Integrated models of signal and background with application to speaker identification in noise", *IEEE transactions on Speech and Audio processing*, vol. 2, no. 2, April 1994, pp. 245-257, by R. C. Rose, et al., "A robust compensation strategy for extraneous acoustic variations in spontaneous speech recognition", *IEEE Transactions on Speech and Audio Processing*, vol. 10, no. 1, pp. 9-17, January 2002, by Hui Jiang, et al., "On maximum mutual information speaker-adapted training", *ICAASP 2002*, vol. 1, pp. 601-604, 2002, by J. McDonough, et al., "Rapid speaker adaptation using multi-stream structural maximum likelihood eigenspace mapping", *ICASSP 2002*, vol. 4, pp. 4166-4169, 2002, by Bowen Zhou, et al., "Online unsupervised learning of hidden Markov models for adaptive speech recognition", *IEEE Proceedings on Vision, Image and Signal Processing*, vol. 148, no. 5, pp. 315-324, October 2001, by J. T. Chien, and "Online Bayesian tree-structured transformation of HMMs with optimal model selection for speaker adaptation", *IEEE Transactions on Speech and Audio Processing*, vol. 9, no. 6, September 2001, by Shaojun Wang, et al. The adaptation conceptually corresponds to projecting the trained models to the testing environment. This kind of projection can be performed at the signal space, at the feature space, and at the model space as shown in FIG. 7, where the acoustic training models 700 are projected into the acoustic testing models 702 representing the environment.

Most of the adaptation techniques developed to date perform the projection in the model space and are based on linear or piece-wise linear transformation. These techniques are computationally expensive, need separate adaptation training data and are not applicable for derivatives of cepstral coefficients. The embodiment of the invention disclosed here also applies the projection in the model space but is applicable for derivatives of cepstral coefficients and does not require separate adaptation training data as most of the other adaptation techniques do and hence is a very practical approach. Instead of gathering multiple acoustic training models, as needed for the rest of the adaptation techniques, for every environmental condition possible, or for every possible nonstandard speaker pronunciation, or for every possible deviation of a sound from the standard sound characteristics, this embodiment adapts the standard acoustic training models available in any sound recognition system which represent standard environments, standard speaker characteristics, and standard sound characteristics. By adapting these standard acoustic training models, the present invention creates new adapted training models which are representative of the current sound disturbances generated by the changing environmental conditions, or the deviation of a speaker from the standard language, or the deviation of a sound from the standard sound characteristics. Furthermore, to achieve near real time speech recognition, the adaptation process should not take much time. Therefore, for quick adaptation, the disclosed invention adapts the models utterance by utterance and, chooses a subset of the models and a subset of the mixture components that need to be projected to match the testing environment. Specifics regarding an embodiment will now be presented. In particular, detailed discussions are provided regarding the "acoustic training model adaptation" portion of the invention.

Acoustic Training Model Adaptation

If the bias (noise, speaker, etc.) in signal space is convolutive, the bias in feature space using Cepstral features will be additive: $y_t = x_t + b_t$ where $b_t$ corresponds to distortion or bias, and t denotes time. Thus, the invention sets the distortion model $\lambda_B$ to be a single Gaussian density with a diagonal covariance matrix, where the single Gaussian density has the form: $p(b_t) = N(b_t; \mu_b, \sigma_b^2)$. Under these assumptions, the structure of the parameter set $\lambda_y$ of the training model space remains the same as that of training set $\lambda_x$, which implies that the means and variances of $\lambda_y$ are derived by adding a bias:

$$\mu_y = \mu_x + \mu_b \qquad (1)$$

$$\sigma_y^2 = \sigma_x^2 + \sigma_b^2 \qquad (2)$$

where $(\mu_x, \sigma_x^2)$ corresponds to training model $\lambda_x$ parameters, $(\mu_y, \sigma_y^2)$ correspond to model $\lambda_y$ parameters, and $(\mu_b, \sigma_b^2)$ denotes the bias parameters, or distortion parameters.

These equations define the model transformation $G_\eta(.)$ with a pair of distortion parameters to be estimated, mainly $\eta = (\mu_b, \sigma_b^2)$, where b stands for "bias". The bias parameters estimation problem can be written as:

$$\eta' = (\mu_b', \sigma_b^{2'}) = \arg\max_{\mu_b, \sigma_b^2} \sum_S \sum_C p(Y, S, C \mid \eta, \Lambda_X) \qquad (3)$$

where Y denotes the training models that need to be matched or estimated (the Y training models represent the current environmental conditions); S denotes a set of chosen standard training models, which are selected from the outer layers of a cluster of standard training models representing a unit of sound; C denotes a subset of the mixture components of the chosen standard training models, wherein the subset of mixture components is selected by comparing the probability associated with each mixture component with a probability threshold value chosen a priori by a user; and $\Lambda_x$ denotes the model trained parameters.

The above optimization problem can be solved iteratively with an Expectation Maximization (EM) algorithm by using an auxiliary function in a maximum likelihood sense (ignoring the prior word probabilities of the language model). The particular auxiliary function used by the present embodiment of the invention to solve the above optimization problem is:

$$Q(\eta' \mid \eta) = \qquad (4)$$
$$-\sum_{t=1}^{T} \sum_{n=1}^{N} \sum_{m=1}^{M} \gamma_t(n, m) \sum_{i=1}^{D} \left[ \frac{1}{2} \log \left( \sigma_{n,m,i}^2 + \sigma_{b_i}^2 + \frac{(y_{t,i} - \mu_{b_i}' - \mu_{n,m,i})^2}{2(\sigma_{n,m,i}^2 + \sigma_{b_i}^2)} \right) \right]$$

where T denotes the length in time of the utterance, N denotes the total number of chosen training models, D denotes the number of mixture components, and M denotes the total number of chosen mixture components.

However, even though this auxiliary function is used in solving the above optimization problem iteratively with an EM algorithm and is discussed in greater detail below, other well-known optimization techniques can also be used to determine the distortion parameters $\eta=(\mu_b,\sigma_b^2)$, depending on the requirements of a particular embodiment.

Taking the derivative of the auxiliary function as defined in equation (4) with respect to $\eta'$ as defined in equation (3) does not result in a closed form solution for $\sigma_{b_i}^{2'}$, however, in "A maximum likelihood approach to stochastic matching for robust speech recognition", *IEEE Trans. On Speech and Audio Processing*, vol. 4, pp. 190-202, May 1996, A. Sankar, et al. show an alternate approach. This embodiment of the invention uses that approach to derive the estimates of the bias parameters $\eta=(\mu_b,\sigma_b^2)$, however a variety of expectation maximization techniques may be used for this purpose. The equations corresponding to estimated bias parameters are provided below.

$$\mu'_{b_i}(n) = \frac{\sum_{t=1}^{T}\sum_{m=1}^{M}\gamma_t(n,m)E(b_{t,i}\,|\,y_{t,i},\text{model}=n,c_t=m,\eta,\Lambda_x)}{\sum_{t=1}^{T}\sum_{m=1}^{M}\gamma_t(n,m)} \quad (5)$$

$$\sigma_{b_i}^{2'}(n) = \frac{\sum_{t=1}^{T}\sum_{m=1}^{M}\gamma_t(n,m)E(b_{t,i}^2\,|\,y_{t,i},\text{model}=n,c_t=m,\eta,\Lambda_x)}{\sum_{t=1}^{T}\sum_{m=1}^{M}\gamma_t(n,m)} - \mu'^2_{b_i} \quad (6)$$

Note that equations (5) and (6) are in the form of a weighted sum where weight $\gamma_t(n,m)$ is the joint likelihood or probability of producing symbol Y at time t, in the acoustic model n, using the class $c_t$ mixture component m given the model (trained) parameters $\Lambda$. That is:

$$\gamma_t(n,m)=p(Y,\text{mod el}=n,c_t=m\,|\,\eta,\Lambda_x) \quad (7)$$

The bias parameters are now estimated for each chosen model n by using equations (5) and (6). In the framework of Hidden Markov Models (HMM), these parameters correspond to Gaussian mixture models (GMM) or boundary model as states.

The conditional expectations E that are needed in the estimation of the bias parameters (distortion parameters) in the above equations (5) and (6) are derived by modifying the algorithm described in "Integrated models of signal and background with application to speaker identification in noise", *IEEE Transactions on Speech and Audio Processing*, vol. 2, no. 2, April 1994, pp. 245-257, by R. C. Rose, et al., which is applicable for additive noise and are given by:

$$E(b_{t,i}\,|\,y_{t,i},\text{model}=n,c_t=m,\eta,\Lambda_x) = \quad (8)$$
$$\mu_{b_i} + \frac{\sigma_{n,m,i}^2}{\sigma_{n,m,i}^2+\sigma_{b_i}^2}(y_{t,i}-\mu_{n,m,i}-\mu_{b_i})$$

$$E(b_{t,i}^2\,|\,y_{t,i},\text{model}=n,c_t=m,\eta,\Lambda_x) = \quad (9)$$
$$\frac{\sigma_{b_i}^2\sigma_{n,m,i}^2}{\sigma_{n,m,i}^2+\sigma_{b_i}^2} + \{E(b_{t,i}\,|\,y_{t,i},\text{model}=n,c_t=m,\eta,\Lambda_x)\}^2$$

Every chosen associated acoustic training model and its associated chosen mixture components have its own mean and variance bias which are added according to equations (1) and (2). To account for the reliability or accuracy of the estimated bias parameters, the update equations (1) and (2) are modified by the present invention as:

$$\mu_y=\mu_x+\alpha_\mu\mu_b \quad (10)$$

$$\sigma_y^2=\sigma_x^2+\alpha_\sigma\sigma_b^2 \quad (11)$$

where $\alpha_\mu$ and $\alpha_\sigma$ can be interpreted either as a step size or a weight indicating the reliability or accuracy of the bias. A small step size means a slower convergence to the optimum solution and/or could indicate a low reliability of the biases $\mu_b$ or $\sigma_b^2$. The values of $\alpha_\mu$ and $\alpha_\sigma$ can be adaptively changed. A novel idea of reliability measurement has been implemented. For each boundary model, the number of mixture components accounted for in equations (5) and (6) are counted. The more data has been collected for a boundary, the higher the reliability of its bias. This leads to a model dependent $\alpha(n)$ which is the same for both mean and variance update. This $\alpha(n)$ is given by:

$$\alpha(n) = \frac{\text{number of mixture components used in bias formula for model } n}{\text{sum of all mixture components used for all models}} \quad (12)$$

The calculation of equation (7) depends on the framework in which an ASR system is implemented. A non-limiting example of how the present invention can be implemented in the Finite State Transducer framework will be presented in the next section. In short, the disclosed on-line, fast speaker/environment adaptation invention corresponds to estimating $\eta$ such that the acoustic likelihood score increases. The iterative procedure is stopped when the acoustic score of the current iteration is same as the previous iteration. The update equations (11) and (12) or the transformation $G_\eta(.)$ is applied only to the chosen associated acoustic training models and their associated chosen mixture components. The models are chosen based on an Euclidean distance where as the mixture components are chosen based on a threshold value.

Implementation Results

An embodiment of the invention was implemented as a new module with the MIT's Summit speech recognizer and was tested using a set of non-standard speakers' speech data. It should be noted that even though this has been implemented as part of MIT's speech recognition engine, the present invention can be implemented with any other speech recognition engine by anyone skilled in the art. Specifics regarding an embodiment of MIT's speech recognition engine, the integration of the present invention into the speech recognition engine, and the experimental results obtained with the present invention will now be presented. In particular, detailed discussions are provided regarding the Implementation Details, the Calculation of $\gamma$ in an FST Framework, and the Experimental Results obtained with the present invention.

a. Implementation Details

As mentioned above this invention has been reduced to practice and has been implemented as a new module as part of MIT's SUMMIT speech recognizer. In brief, SUMMIT is part of a spoken dialogue based system that is developed by MIT's Spoken Language Processing (SLS) group. This system from lowest to highest level of processing consists of the SUMMIT, SAPPHIRE and GALAXY systems. The disclosed speaker adaptation module has been implemented by making changes to SUMMIT and SAPPHIRE code.

The MIT SUMMIT System is a segment-based probabilistic speech recognition system. SUMMIT starts the recognition process by first transforming the speech signal into a MEL-frequency based representation. Using this signal representation, acoustic landmarks of varying robustness are located and embedded in an acoustic network. The sequence of landmarks/boundaries represents time. The segments in the network are then mapped to phoneme hypotheses, using a set of automatically determined acoustic parameters in conjunction with conventional pattern recognition algorithms. The result is a phonetic network, in which each arc is characterized by a vector of probabilities for all the possible candidates. Each segment can have one or more "landmarks" or "boundaries" each of which is represented by a boundary model (GMM). During recognition, the phonetic network is matched to a pre-compiled pronunciation network to determine the best word hypothesis. An Ngram language model is used with a Viterbi search.

SUMMIT uses a Finite State Transducer (FST) framework where each speech segment is represented by a state. The Viterbi training is used (instead of the Baum-Welch training), resulting in a hypothesis based N-best scoring for recognition. The code is written in both C and C++, with an emphasis of producing new code in C++.

The MIT SAPPHIRE System is an ostensible, object-oriented toolkit allowing researchers to rapidly build and configure customized speech analysis tools. It is implemented in Tcl/Tk and C/C++ and it provides a wide range of functionality, including the ability to configure and run the SUMMIT speech recognition system. The SAPPHIRE acts as a Tcl/Tk shell with added speech signal processing commands and objects for speech processing.

b. Calculation of $\gamma$ in an FST Framework

As mentioned in the previous section the implementation of $\gamma_t(n,m)$ in equation (12) depends on the ASR engine. For example, the SUMMIT is based on FST framework. The FST framework allows representation of information sources and data structures used in recognition, which includes context-dependent units, pronunciation dictionaries, language models, and lattices within a uniform structure. In particular, a single composition algorithm is used to combine both information sources such as language models and dictionaries in advance and acoustic observations and information sources dynamically during recognition. During speech preprocessing each utterance is split in a number of landmarks or boundaries that delineate main changes in speech features. A boundary vector is composed of several adjacent frame feature vectors and is modeled by a boundary model—GMM. In SUMMIT, currently about 1500 different boundary models are used; 92 of which are non-transitional. During recognition, SUMMIT groups the boundaries to segments/phones by making use of language model and pronunciation dictionary restrictions that have been set in advance. Up to 200 hypotheses are calculated using an FST model where each state corresponds to a segment/phone. The N best hypotheses are output. Each hypothesis can have a different number of segments, different segments or phones, segments differing in lengths, etc. In the current version of SUMMIT, transition probabilities are not used. All phone to phone and boundary to boundary transitions are assumed equally likely and have been assigned a log-based score of zero.

To compute $\gamma_t(n,m)$, the probability of the $m^{th}$ mixture component of acoustic training model n producing the observation o at time t given the past and the future path through the models, the $P(o_t|mod\ el=n, mixt=m,\lambda)=P_t(n,m)$ is needed which can be defined as:

$$P_t(n,m) = \frac{w_{n,m} N(o_t; \mu_{n,m}, C_{n,m})}{\sum_{j=1}^{M} w_{n,j} N(o_t; \mu_{n,j}, C_{n,j})} \quad (13)$$

where $w_{n,m}$ is the weight of mixture component m of model n, and N indicates the Normal distribution. With this probability and the fact that all boundary transitions are equally likely, we can write:

$$\gamma_t(n,m) = \prod_{t_i=1}^{t-1}\left(\sum_{k=1}^{M_{c(t_i)}} P_{t_i}(c(t_i),k)\right) \cdot \quad (14)$$
$$P_t(n,m) \cdot \prod_{t_i=t+1}^{T}\left(\sum_{k=1}^{M_{c(t_i)}} P_{t_i}(c(t_i),k)\right)$$

where $M_{c(t_i)}$ is the number of mixture components of the hypothesized model at time $t_i$ and T is the total number of boundaries. The first product term in the above equation corresponds to forward probability $\alpha$ and the second product term corresponds to backward probability $\beta$. These two probabilities are computed as follows:

At each boundary there is a model for each of the N-best hypotheses. The same model may be selected by more than one hypothesis. For the N-best hypotheses and series of landmarks there is a set of unique models for the utterance. In the adaptation only this set of models is considered.

At each time boundary or landmark, forward and backward probabilities are obtained by calculating the probability to be in a model m at time landmark t by summing the mixture log probability score along each hypothesis to the boundary t and the associated partial score with the model m for that hypothesis. The log probabilities were then re-scaled (to prevent machine overflow) and then converted to a relative probability by exponentiation. These numbers were then scaled to add to 1.0 when summed over the N-best hypotheses (i.e. converted to probabilities.). Finally, if a model occurred for more than one hypothesis, the results were combined so that it occurred only once at t.

c. Experimental Results

After implementing the disclosed invention as part of SUMMIT as a new module called "Adaptation", it was tested using non-standard speakers' data. Basically, the adaptation is performed with an inner loop adjusting the models and an outer loop to re-process the same utterance several times as shown in FIG. 5 to make sure there is convergence. After the EM calculation, new scores are calculated by running the recognizer SUMMIT with the updated models, and wherein the recognizer SUMMIT has its own "pattern matching" portion, "word generator" portion, and "sentence generator" portion. If the update increases the total probability score, the models are updated again. If not, the previous set of models (the best) is restored. Since the EM iteration, located within the "acoustic training model adaptation" portion 526 in FIG. 5, seems to converge in at most two trials, the adaptation can be achieved in real-time. For the selection of mixture components, a thresholding technique was used as mentioned before. It should be noted that no separate adaptation training data was used, instead the standard acoustic training models available on the SUMMIT recognizer were adapted to the current environmental conditions.

The recognition output obtained using the present invention with one speaker for 24 utterances is summarized below. The sentences labeled REF corresponds to the reference utterance; the sentences labeled HYPu corresponds to the best hypothesis when no adaptation is used; and the sentences labeled HYPa corresponds to the best hypothesis when adaptation is used:

REF: can you tell me about the VIETNAMESE RESTAURANTS in CAMBRIDGE

HYPu: can you tell me about the WINDIEST RESTAURANT in TEMPERATURE
HYPa: can you tell me about the WINDIEST restaurants in TEMPERATURE
REF: Cambridge Mass.
HYPu: Cambridge Mass.
HYPa: Cambridge Mass.
REF: Worcester Mass.
HYPu: Worcester Mass.
HYPa: Worcester Mass.
REF: okay tell me about THEVIETNAMESE**RESTAURANTS in Worcester Mass.
HYPu: okay tell me about YOU IN A NICE AFTERNOON in Worcester Mass.
HYPa: okay tell me about YOU DID A NICE AFTERNOON in Worcester Mass.
REF: tell me about the current weather CONDITIONS in Worcester Mass.
HYPu: tell me about the current weather CONDITION in Worcester Mass.
HYPa: tell me about the current weather CONDITION in Worcester Mass.
REF: can you tell me the weather forecast for Martha+s Vineyard Mass.
HYPu: can you tell me the weather forecast for Martha+s Vineyard Mass.
HYPa: can you tell me the weather forecast for Martha+s Vineyard Mass.
REF: can you tell me the chance of snow in Phoenix Ariz.
HYPu: can you tell me the chance of snow in Phoenix Ariz.
HYPa: can you tell me the chance of snow in Phoenix Ariz.
REF: tell me the high and THE low temperature in Las Vegas Nev. for tomorrow
HYPu: tell me the high and *** low temperature in Las Vegas Nev. for tomorrow
HYPa: tell me the high and *** low temperature in Las Vegas Nev. for tomorrow
REF: please tell me the chance of rain tomorrow in Las Vegas Nev.
HYPu: please GIVE me the chance of rain tomorrow in Las Vegas Nev.
HYPa: please tell me the chance of rain tomorrow in Las Vegas Nev.
REF: please tell me the time for sunset and sunrise tomorrow in Las Vegas Nev.
HYPu: please tell me the time for sunset and sunrise tomorrow in Las Vegas Nev.
HYPa: please tell me the time for sunset and sunrise tomorrow in Las Vegas Nev.
REF: okay what about HUMIDITY
HYPu: okay what about TODAY
HYPa: okay what about TODAY
REF: IN THAT CASE can you tell me the barometric pressure in THE las vegas valley
HYPu: CAN I PLEASE can you tell me the barometric pressure in *** las vegas valley
HYPa: CAN I PLEASE can you tell me the barometric pressure in *** las vegas valley
REF: okay let+s move on i want to find a place in the United States of America where it is warm and sunny ***
HYPu: CAN I move on i want to find a place in the United States of America where it is warm and sunny AND
HYPa: okay let+s move on i want to find a place in the United States of America where it is warm and sunny AND
REF: LET+S NARROW IT down to california tell me a place on the pacific coast that is warm and sunny
HYPU: *** **  down to california tell me a place on the pacific coast that is warm and sunny
HYPa: I AM ** down to california tell me a place on the pacific coast that is warm and sunny
REF: okay i think san diego please tell me about the temperature there
HYPu: okay i think san diego please tell me about the temperature there
HYPa: okay i think san diego please tell me about the temperature there
REF: can you please tell me the forecast for snowstorms in the northeastern United States
HYPu: can you please tell me the forecast for snowstorms in the northeastern United States
HYPa: can you please tell me the forecast for snowstorms in the northeastern United States
REF: okay
HYPu: okay
HYPa: okay
REF: will there be A chance of a snowstorm in maine
HYPu: WHAT IS THE * chance of a snowstorm in maine
HYPa: will there be a chance of a snowstorm in maine
REF: tell me about Portland
HYPu: tell me about portland
HYPa: tell me about portland
REF: okay tell me about THE chance of a snowstorm in ***
HYPu: okay tell me about A chance of a snowstorm in NEW
HYPa: okay tell me about the chance of a snowstorm in NEW
REF: how about Baltimore
HYPu: how about baltimore
HYPa: how about Baltimore
REF: can you tell me about the weather forecast for Charleston S.C
HYPu: can you tell me about the weather forecast for Charleston S.C
HYPa: can you tell me about the weather forecast THE Charleston S.C
REF: please TELL me the high temperature in
HYPu: please GIVE me the high temperature in
HYPa: please GIVE me the high temperature in
REF: how about Bismarck
HYPu: how about bismarck
HYPa: how about Bismarck
Unadapted:

| WORD ACCURACY = | 87.5% | | |
|---|---|---|---|
| Substitutions = | 8.2% | (19) | 0.8/sentence |
| Insertions = | 1.7% | ( 4) | 0.2/sentence |
| Deletions = | 2.6% | ( 6) | 0.2/sentence |
| Deletions of THE = | 0.9% | ( 2) | 0.1/sentence |
| Errors = | 12.5% | (29) | 1.2/sentence |

Adapted:

| WORD ACCURACY = | 90.9% | | |
|---|---|---|---|
| Substitutions = | 6.0% | (14) | 0.6/sentence |
| Insertions = | 1.7% | ( 4) | 0.2/sentence |
| Deletions = | 1.3% | ( 3) | 0.1/sentence |
| Deletions of THE = | 0.9% | ( 2) | 0.1/sentence |
| Errors = | 9.1% | (21) | 0.9/sentence |

From this we can see that the recognition accuracy improved by 3.9% after applying an embodiment of the present invention to perform adaptation for this speaker. These results are statistically significant in a crowded art such as speech recognition. For the other non-standard speaker, the recognition accuracy was further improved by 7%. In this experiment 24 utterances were used. Numerous experiments were performed using the embodiment of the invention, and all the results reflected similar trends for different non-standard speakers. It should be noted again that for all these non-standard speakers, the adaptation and thus the improvement in recognition accuracy was achieved utterance by utterance by not using separate adaptation training data (i.e., separate acoustic training models corresponding to each particular environmental condition). Note also that in spoken dialogue based systems natural language processing techniques are applied to the output of the speech recognizer. The recognition accuracy improvement of 4 to 7% will improve the overall performance of the spoken dialogue system by 15 to 20%, which would significantly help in improving the user's satisfaction while using automatic speech recognition systems.

ADVANTAGES OF THE INVENTION

A system for fast on-line adaptation of acoustic training models to achieve robust automatic audio recognition in the presence of sound disturbances was presented. A detailed embodiment of the present invention enables the automatic real-time audio recognition of a non-standard speaker or non-standard sounds in the presence of sound disturbances, such as the disturbances created by changing environmental conditions, deviation of a speaker's accent from the standard language, and deviation of a sound from the standard sound characteristics, without the need to acquire separate acoustic training models, or adaptation training data, that correspond to the current environmental conditions.

The results generated by the embodiments of the invention indicate that the disclosed on-line fast adaptation technique adapts the required acoustic training models fast and improves the recognition accuracy significantly. The previously described embodiments of the present invention have many advantages, including: the invention does not need separate adaptation training data which is impractical to obtain since ASR systems can be used by anybody, at any time, and anywhere; real-time on-line adaptation can be achieved since it adapts only a small subset of acoustic training models that need to be adapted and the EM algorithm converges within two iterations; and the invention can be integrated as part of any stand-alone speech recognition engine, which has been demonstrated by implementing an embodiment of the invention as part of the SUMMIT recognizer. Furthermore, the present invention does not require that all the advantageous features and all the advantages need to be incorporated into every embodiment of the invention.

Although the present invention has been described in considerable detail with reference to certain embodiments thereof, other embodiments are possible. For example, other optimization techniques besides Estimation Maximization may be used to determine the distortion parameters needed to adapt the acoustic training models to the current environmental conditions, also different auxiliary functions can be used to determine the distortion parameters. Therefore, the spirit and scope of the appended claims should not be limited to the description of the embodiments contained herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

What is claimed is:

1. A method for fast on-line automatic speaker/environment adaptation suitable for speech/speaker recognition in the presence of changing environmental conditions, the method comprising acts of:

performing front-end processing on an acoustic input signal, wherein the front-end processing generates MEL frequency cepstral features representative of the acoustic input signal;

performing recognition and adaptation by:
providing the MEL frequency cepstral features to a speech recognizer, wherein the speech recognizer utilizes the MEL frequency cepstral features and a current list of acoustic training models to determine at least one best hypothesis;
receiving, from the speech recognizer, at least one best hypothesis, associated acoustic training models, and associated probabilities;
computing a pre-adaptation acoustic score by recognizing an utterance using the associated acoustic training models;
choosing acoustic training models from the associated acoustic training models;
performing adaptation on the chosen associated acoustic training models;
computing a post-adaptation acoustic score by recognizing the utterance using the adapted acoustic training models;
comparing the pre-adaptation acoustic score with the post-adaptation acoustic score to check for improvement; modifying the current list of acoustic training models to include the adapted acoustic training models, if the acoustic score improved after performing adaptation; and performing recognition and adaptation iteratively until the acoustic score ceases to improve;

choosing the best hypothesis as recognized words once the acoustic score ceases to improve; and outputting the recognized words.

2. A method for fast on-line automatic speaker/environment adaptation as set forth in claim 1, further comprising an act of receiving an acoustic input signal from an audio inputting device, the audio inputting device is selected from a group consisting of a microphone, a radio, a cellular wireless telephone, a telephone receiver, and an audio recording medium used to gather data in random environments and from non-standard speakers, the audio recording medium selected from a group consisting of an audio Compact Disk (CD), a cassette tape, a Digital Versatile Disk/Digital Video Disk (DVD), a video cassette, and a Long Play (LP) record.

3. A method for fast on-line automatic speaker/environment adaptation as set forth in claim 2, wherein in the act of performing recognition and adaptation, the current list of acoustic training models available in the speech recognizer is comprised of a plurality of acoustic training models that are dependent on a speaker or on environmental conditions.

4. A method for fast on-line automatic speaker/environment adaptation as set forth in claim 3, wherein, in the act of performing recognition and adaptation, the speech recognizer comprises a pattern matching act, a word generator act, and a sentence generator act.

5. A method for fast on-line automatic speaker/environment adaptation as set forth in claim 4, wherein, in the act of performing recognition and adaptation, the speech recognizer inputs the MEL frequency cepstral features and the current list of acoustic training models into a pattern matching act, and the pattern matching act produces a set of units of sound.

6. A method for fast on-line automatic speaker/environment adaptation as set forth in claim 5, wherein, in the act of performing recognition and adaptation, the pattern matching act of the speech recognizer comprises the acts of:
generating a probability distribution function representing the inputted MEL frequency cepstral features;
comparing the probability distribution function representing the inputted MEL frequency cepstral features with a plurality of probability distribution functions corresponding to all acoustic training models stored in the current list of acoustic training models; and
selecting a set of units of sound that correspond to closer matches between the probability distribution function of the MEL frequency cepstral features and the probability distribution functions of all the models in the current list of acoustic training models.

7. A method for fast on-line automatic speaker/environment adaptation as set forth in claim 6, wherein the MEL-frequency cepstral representation has acoustic landmarks of varying robustness, and where the pattern matching act locates the acoustic landmarks from the MEL-frequency cepstral representation, and embeds the acoustic landmarks into an acoustic network.

8. A method for fast on-line automatic speaker/environment adaptation as set forth in claim 7, wherein the acoustic network includes segments, and wherein the pattern matching act further maps the segments in the acoustic network to units of sound hypotheses using a set of automatically determined acoustic parameters and acoustic training models in conjunction with pattern recognition algorithms.

9. A method for fast on-line automatic speaker/environment adaptation as set forth in claim 8, wherein in the pattern matching act, a phoneme corresponds to a unit of sound and the pattern matching act outputs phoneme hypotheses.

10. A method for fast on-line automatic speaker/environment adaptation as set forth in claim 9, further comprising an act of getting phonotactic models for the word generator act from a plurality of available phonotactic models, wherein the phonotactic models are independent from a speaker or from environmental conditions.

11. A method for fast on-line automatic speaker/environment adaptation as set forth in claim 10, wherein the word generator act generates a set of word hypotheses by comparing the set of units of sound with the phonotactic models.

12. A method for fast on-line automatic speaker/environment adaptation as set forth in claim 11, further comprising an act of getting language models for the sentence generator act from a plurality of available language models, wherein the language models are independent from a speaker or from environmental conditions.

13. A method for fast on-line automatic speaker/environment adaptation as set forth in claim 12, wherein the sentence generator act generates a set of sentence hypotheses by comparing the set of word hypotheses and the language models.

14. A method for fast on-line automatic speaker/environment adaptation as set forth in claim 13, wherein the speech recognizer outputs the set of sentence hypotheses produced by the sentence generator act, and a set of likelihood measures, wherein each likelihood measure is associated with a sentence hypothesis in the set of sentence hypotheses.

15. A method for fast on-line automatic speaker/environment adaptation as set forth in claim 14, wherein the likelihood measure for each sentence hypothesis comprises a probability associated with a unit of sound, a set of probabilities associated with that unit of sound transitioning to several other units of sound, a probability associated with a word, and a set of probabilities associated with the word transitioning to several other words.

16. A method for fast on-line automatic speaker/environment adaptation as set forth in claim 15, wherein the act of performing recognition and adaptation chooses a hypothesis with a highest likelihood measure to be a best hypothesis, and outputs at least one best hypothesis and its associated acoustic training models.

17. A method for fast on-line automatic speaker/environment adaptation as set forth in claim 16, wherein, in the act of performing recognition and adaptation, the acoustic training models are stored in the current list of acoustic training models by grouping together the acoustic training models, representative of a unit of sound, thus forming clusters of models, and wherein each cluster of models representative of a unit of sound has an outer layer.

18. A method for fast on-line automatic speaker/environment adaptation as set forth in claim 17, wherein the act of performing recognition and adaptation further uses an Euclidean distance measure to select only the associated training models located on the outer layer of each cluster to be adapted, furthermore wherein the number of selected acoustic training models varies from utterance to utterance.

19. A method for fast on-line automatic speaker/environment adaptation as set forth in claim 18, wherein the chosen acoustic training models associated with the best hypothesis have a set of mixture components, and wherein the act of adaptation estimates the distortion parameters for each chosen associated acoustic training model and for a chosen sub-set of mixture components from each chosen associated acoustic training model.

20. A method for fast on-line automatic speaker/environment adaptation as set forth in claim 19, wherein each mixture component has a probability associated with it, and the chosen sub-set of mixture components is selected based on a fixed probability threshold value set a priori by a user, wherein only mixture components selected for adaptation are mixture components whose associated probability is at least equal to the chosen probability threshold value, and wherein the number of selected mixture components varies from utterance to utterance.

21. A method for fast on-line automatic speaker/environment adaptation as set forth in claim 20, wherein, in the act of performing recognition and adaptation, the associated acoustic training models are adapted by incorporating distortion parameters representative of current sound disturbances selected from a group consisting of changing environmental conditions, deviation of a speaker from the standard language, and deviation of a sound from the standard sound characteristics.

22. A method for fast on-line automatic speaker/environment adaptation as set forth in claim 21, wherein the associated acoustic training models differ from acoustic training models representing the current sound disturbances, and wherein the distortion parameters consist of a bias mean value and a bias standard deviation value, representing differences between a mean and standard deviation of the associated acoustic training models, and a mean and standard deviation of the acoustic training models representing the current sound disturbances.

23. A method for fast on-line automatic speaker/environment adaptation as set forth in claim 22, wherein the act of performing recognition and adaptation initializes the distortion parameters of the chosen associated acoustic training models to an initial bias mean value and an initial bias standard deviation value.

24. A method for fast on-line automatic speaker/environment adaptation as set forth in claim 23, further comprising an act of computing an auxiliary function based on the initial bias mean value and the initial bias standard deviation value of the distortion parameters.

25. A method for fast on-line automatic speaker/environment adaptation as set forth in claim 24, further comprising an act of iteratively performing Estimation Maximization of the auxiliary function over the chosen associated acoustic training models and mixture components, and wherein the Estimation Maximization results in finding the distortion parameters that model most closely current environmental conditions, a present non-standard speaker acoustic model, or a present distorted sound acoustic model.

26. A method for fast on-line automatic speaker/environment adaptation as set forth in claim 25, wherein the chosen associated acoustic training models is adapted by adding the distortion parameters, the distortion parameters consisting of a bias mean value and a bias standard deviation value, to the mean and standard deviation of the previously chosen associated acoustic training models, and wherein the chosen associated acoustic training models that have been adapted are labeled as adapted acoustic training models.

27. A method for fast on-line automatic speaker/environment adaptation as set forth in claim 26, wherein in the act of performing recognition and adaptation, in the computing of an acoustic score, the acoustic training models include one of: associated acoustic training models or adapted acoustic training models; and the computing is performed by determining the best hypothesis using the acoustic training models and then combining a proper subset of the resulting associated probabilities from the best hypothesis, wherein the resulting associated probabilities from the best hypothesis used to determine the acoustic score comprise the probability associated with a unit of sound and a set of probabilities associated with that unit of sound transitioning to several other units of sound.

28. A method for fast on-line automatic speaker/environment adaptation as set forth in claim 27, wherein in the act of outputting the recognized words, the outputting device is selected from a group consisting of a speaker-unit coupled with a computer system, a computer monitor, a electromagnetic wave representation of an audio transmission, an audio Compact Disk (CD), a cassette tape, a Digital Versatile Disk/Digital Video Disk (DVD), a video cassette, and a Long Play (LP) record.

29. A method for fast on-line automatic speaker/environment adaptation as set forth in claim 1, wherein the act of performing recognition and adaptation further outputs the adapted acoustic training models that yielded the best hypothesis into a database of acoustic training models, wherein the database of acoustic training models will grow as new adapted acoustic training models generate new best hypothesis results for scenarios that include at least one of: changing environmental conditions, deviation of a speaker from the standard language, and deviation of a sound from the standard sound characteristics.

30. A method for fast on-line automatic speaker/environment adaptation as set forth in claim 29, wherein the database of acoustic training models is tailored for non-standard speaker recognition, suitable for speech/speaker recognition applications comprising INS surveillance, national security surveillance, airport surveillance, automatic-speech telephone queries, air travel reservations, voice activated command and control systems, and automatic translation.

31. A method for fast on-line automatic speaker/environment adaptation as set forth in claim 1, wherein, in the act of performing recognition and adaptation, the acoustic training models are stored in the current list of acoustic training models by grouping together the acoustic training models representative of a unit of sound, thus forming clusters of models, and wherein each cluster of models, representative of a unit of sound, has an outer layer.

32. A method for fast on-line automatic speaker/environment adaptation as set forth in claim 31, wherein the act of performing recognition and adaptation further uses an Euclidean distance measure to select only the associated training models located on the outer layer of each cluster to be adapted, furthermore wherein the number of selected acoustic training models varies from utterance to utterance.

33. A method for fast on-line automatic speaker/environment adaptation as set forth in claim 1, wherein the chosen acoustic training models associated with the best hypothesis have a set of mixture components, and wherein the act of adaptation estimates distortion parameters for each chosen associated acoustic training model and for a chosen sub-set of mixture components from each chosen associated acoustic training model.

34. A method for fast on-line automatic speaker/environment adaptation as set forth in claim 33, wherein each mixture component has a probability associated with it, and the chosen sub-set of mixture components is selected based on a fixed probability threshold value set a priori by a user, wherein only mixture components selected for adaptation are mixture components whose associated probability is at least equal to the chosen probability threshold value, and wherein the number of selected mixture components varies from utterance to utterance.

35. A method for fast on-line automatic speaker/environment adaptation as set forth in claim 1, wherein the associated acoustic training models differ from acoustic training models representing the current sound disturbances, and wherein distortion parameters consist of a bias mean value and a bias standard deviation value, representing differences between a mean and standard deviation of the associated acoustic training models, and a mean and standard deviation of the acoustic training models representing the current sound disturbances.

36. A method for fast on-line automatic speaker/environment adaptation as set forth in claim 35, wherein, in the act of performing recognition and adaptation, the associated acoustic training models are adapted by incorporating the distortion parameters representative of current sound disturbances selected from a group consisting of changing environmental conditions, deviation of a speaker from the standard language, and deviation of a sound from the standard sound characteristics.

37. A method for fast on-line automatic speaker/environment adaptation as set forth in claim 36, wherein the act of performing recognition and adaptation initializes the distortion parameters of the chosen associated acoustic training models to an initial bias mean value and an initial bias standard deviation value.

38. A method for fast on-line automatic speaker/environment adaptation as set forth in claim 37, further comprising an act of computing an auxiliary function based on the initial bias mean value and the initial bias standard deviation value of the distortion parameters.

39. A method for fast on-line automatic speaker/environment adaptation as set forth in claim 38, further comprising an act of iteratively performing Estimation Maximization of the auxiliary function over the chosen associated acoustic training models and mixture components, and wherein the Estimation Maximization results in finding the distortion parameters that model most closely current environmental conditions, a present non-standard speaker acoustic model, or a present distorted sound acoustic model.

40. A method for fast on-line automatic speaker/environment adaptation as set forth in claim 36, wherein the chosen associated acoustic training models is adapted by adding the distortion parameters, the distortion parameters consisting of a bias mean value and a bias standard deviation value, to the mean and standard deviation of the previously chosen associated acoustic training models, and wherein the chosen associated acoustic training models that have been adapted are labeled as adapted acoustic training models.

41. A method for fast on-line automatic speaker/environment adaptation as set forth in claim 1, wherein in the act of performing recognition and adaptation, in the computing of an acoustic score, the acoustic training models include one of: associated acoustic training models or adapted acoustic training models; and the computing is performed by determining the best hypothesis using the acoustic training models and then combining a proper subset of the resulting associated probabilities from the best hypothesis, wherein the resulting associated probabilities from the best hypothesis used to determine the acoustic score comprise the probability associated with a unit of sound and a set of probabilities associated with that unit of sound transitioning to several other units of sound.

42. A system for fast on-line automatic speaker/environment adaptation suitable for speech/speaker recognition in the presence of changing environmental conditions, the system comprising:
a computer system including a processor, a memory coupled with the processor, an input coupled with the processor for receiving an acoustic input signal, the computer system further comprising means, residing in its processor and memory for:
performing front-end processing on the acoustic input signal, wherein the front-end processing generates MEL frequency cepstral features representative of the acoustic input signal;
performing recognition and adaptation by:
providing the MEL frequency cepstral features to a speech recognizer, wherein the speech recognizer utilizes the MEL frequency cepstral features and a current list of acoustic training models to determine at least one best hypothesis;
receiving, from the speech recognizer, at least one best hypothesis, associated acoustic training models, and associated probabilities;
computing a pre-adaptation acoustic score by recognizing an utterance using the associated acoustic training models;
choosing acoustic training models from the associated acoustic training models;
performing adaptation on the chosen associated acoustic training models;
computing a post-adaptation acoustic score by recognizing the utterance using the adapted acoustic training models;
comparing the pre-adaptation acoustic score with the post-adaptation acoustic score to check for improvement; modifying the current list of acoustic training models to include the adapted acoustic training models, if the acoustic score improved after performing adaptation; and performing recognition and adaptation iteratively until the acoustic score ceases to improve;
choosing the best hypothesis as recognized words once the acoustic score ceases to improve; and
outputting the recognized words.

43. A system for fast on-line automatic speaker/environment adaptation as set forth in claim 42, further comprising means for receiving the acoustic input signal from an audio inputting device, the audio inputting device is selected from a group consisting of a microphone, a radio, a cellular wireless telephone, a telephone receiver, and an audio recording medium used to gather data in random environments and from non-standard speakers, the audio recording medium selected from a group consisting of an audio Compact Disk (CD), a cassette tape, a Digital Versatile Disk/Digital Video Disk (DVD), a video cassette, and a Long Play (LP) record.

44. A system for fast on-line automatic speaker/environment adaptation as set forth in claim 43, wherein in the means for performing recognition and adaptation, the current list of acoustic training models available in the speech recognizer is comprised of a plurality of acoustic training models that are dependent on a speaker or on environmental conditions.

45. A system for fast on-line automatic speaker/environment adaptation as set forth in claim 44, wherein, in the means for performing recognition and adaptation, the speech recognizer comprises means for:
pattern matching;
word generation; and
sentence generation.

46. A system for fast on-line automatic speaker/environment adaptation as set forth in claim 45, wherein, in the means for performing recognition and adaptation, the speech recognizer inputs the MEL frequency cepstral features and the current list of acoustic training models into a pattern matching act, and the pattern matching act produces a set of units of sound.

47. A system for fast on-line automatic speaker/environment adaptation as set forth in claim 46, wherein, in the means for performing recognition and adaptation, the means for pattern matching of the speech recognizer comprises the means for:
generating a probability distribution function representing the inputted MEL frequency cepstral features;
comparing the probability distribution function representing the inputted MEL frequency cepstral features with a plurality of probability distribution functions corresponding to all acoustic training models stored in the current list of acoustic training models; and
selecting a set of units of sound that correspond to closer matches between the probability distribution function of the MEL frequency cepstral features and the probability distribution functions of all the models in the current list of acoustic training models.

48. A system for fast on-line automatic speaker/environment adaptation as set forth in claim 47, wherein the MEL-frequency cepstral representation has acoustic landmarks of varying robustness, and where the means for pattern matching locates the acoustic landmarks from the MEL-frequency cepstral representation, and embeds the acoustic landmarks into an acoustic network.

49. A system for fast on-line automatic speaker/environment adaptation as set forth in claim 48, wherein the acoustic network includes segments, and wherein the means for pattern matching further maps the segments in the acoustic network to units of sound hypotheses using a set of automatically determined acoustic parameters and acoustic training models in conjunction with pattern recognition algorithms.

50. A system for fast on-line automatic speaker/environment adaptation as set forth in claim 49, wherein in the means for pattern matching, a phoneme corresponds to a unit of sound and the means for pattern matching outputs phoneme hypotheses.

51. A system for fast on-line automatic speaker/environment adaptation as set forth in claim 50, further comprising means for getting phonotactic models for the means for word generation from a plurality of available phonotactic models, wherein the phonotactic models are independent from a speaker or from environmental conditions.

52. A system for fast on-line automatic speaker/environment adaptation as set forth in claim 51, wherein the means for word generation generates a set of word hypotheses by comparing the set of units of sound with the phonotactic models.

53. A system for fast on-line automatic speaker/environment adaptation as set forth in claim 52, further comprising means for getting language models for the means for sentence generation from a plurality of available language models, wherein the language models are independent from a speaker or from environmental conditions.

54. A system for fast on-line automatic speaker/environment adaptation as set forth in claim 53, wherein the means for sentence generation generates a set of sentence hypotheses by comparing the set of word hypotheses and the language models.

55. A system for fast on-line automatic speaker/environment adaptation as set forth in claim 54, wherein the speech recognizer outputs the set of sentence hypotheses produced by the means for sentence generation, and a set of likelihood measures, wherein each likelihood measure is associated with a sentence hypothesis in the set of sentence hypotheses.

56. A system for fast on-line automatic speaker/environment adaptation as set forth in claim 55, wherein the likelihood measure for each sentence hypothesis comprises a probability associated with a unit of sound, a set of probabilities associated with that unit of sound transitioning to several other units of sound, a probability associated with a word, and a set of probabilities associated with the word transitioning to several other words.

57. A system for fast on-line automatic speaker/environment adaptation as set forth in claim 56, wherein the means for performing recognition and adaptation chooses a hypothesis with a highest likelihood measure to be a best hypothesis, and outputs at least one best hypothesis and its associated acoustic training models.

58. A system for fast on-line automatic speaker/environment adaptation as set forth in claim 57, wherein, in the means for performing recognition and adaptation, the acoustic training models are stored in the current list of acoustic training models by grouping together the acoustic training models representative of a unit of sound, thus forming clusters of models, and wherein each cluster of models representative of a unit of sound has an outer layer.

59. A system for fast on-line automatic speaker/environment adaptation as set forth in claim 58, wherein the means for performing recognition and adaptation further uses an Euclidean distance measure to select only the associated training models located on the outer layer of each cluster to be adapted, furthermore wherein the number of selected acoustic training models varies from utterance to utterance.

60. A system for fast on-line automatic speaker/environment adaptation as set forth in claim 59, wherein the chosen acoustic training models associated with the best hypothesis have a set of mixture components, and wherein the means for adaptation estimates the distortion parameters for each chosen associated acoustic training model and for a chosen subset of mixture components from each chosen associated acoustic training model.

61. A system for fast on-line automatic speaker/environment adaptation as set forth in claim 60, wherein each mixture component has a probability associated with it, and the chosen sub-set of mixture components is selected based on a fixed probability threshold value set a priori by a user, wherein only mixture components selected for adaptation are mixture components whose associated probability is at least equal to the chosen probability threshold value, and wherein the number of selected mixture components varies from utterance to utterance.

62. A system for fast on-line automatic speaker/environment adaptation as set forth in claim 61, wherein, in the means for performing recognition and adaptation, the associated acoustic training models are adapted by incorporating distortion parameters representative of current sound disturbances selected from a group consisting of changing environmental conditions, deviation of a speaker from the standard language, and deviation of a sound from the standard sound characteristics.

63. A system for fast on-line automatic speaker/environment adaptation as set forth in claim 62, wherein the associated acoustic training models differ from acoustic training models representing the current sound disturbances, and wherein the distortion parameters consist of a bias mean value and a bias standard deviation value, representing differences between a mean and standard deviation of the associated acoustic training models, and a mean and standard deviation of the acoustic training models representing the current sound disturbances.

64. A system for fast on-line automatic speaker/environment adaptation as set forth in claim 63, wherein the means for performing recognition and adaptation initializes the distortion parameters of the chosen associated acoustic training models to an initial bias mean value and an initial bias standard deviation value.

65. A system for fast on-line automatic speaker/environment adaptation as set forth in claim 64, further comprising means for computing an auxiliary function based on the initial bias mean value and the initial bias standard deviation value of the distortion parameters.

66. A system for fast on-line automatic speaker/environment adaptation as set forth in claim 65, further comprising means for iteratively performing Estimation Maximization of the auxiliary function over the chosen associated acoustic training models and mixture components, and wherein the Estimation Maximization results in finding the distortion parameters that model most closely current environmental conditions, a present non-standard speaker acoustic model, or a present distorted sound acoustic model.

67. A system for fast on-line automatic speaker/environment adaptation as set forth in claim 66, wherein the chosen subset of associated acoustic training models is adapted by adding the distortion parameters, the distortion parameters consisting of a bias mean value and a bias standard deviation value, to the mean and standard deviation of the previously chosen associated acoustic training models, and wherein the chosen associated acoustic training models that have been adapted are labeled as adapted acoustic training models.

68. A system for fast on-line automatic speaker/environment adaptation as set forth in claim 67, wherein in the means for performing recognition and adaptation, in the computing of an acoustic score, the acoustic training models include one of: associated acoustic training models or adapted acoustic training models; and the computing is performed by determining the best hypothesis using the acoustic training models and then combining a proper subset of the resulting associated probabilities from the best hypothesis, wherein the resulting associated probabilities from the best hypothesis used to determine the acoustic score comprise the probability associated with a unit of sound and a set of probabilities associated with that unit of sound transitioning to several other units of sound.

69. A system for fast on-line automatic speaker/environment adaptation as set forth in claim 68, wherein in the means for outputting the recognized words, the outputting device is selected from a group consisting of a speaker-unit coupled with a computer system, a computer monitor, a electromagnetic wave representation of an audio transmission, an audio Compact Disk (CD), a cassette tape, a Digital Versatile Disk/Digital Video Disk (DVD), a video cassette, and a Long Play (LP) record.

70. A system for fast on-line automatic speaker/environment adaptation as set forth in claim 42, wherein the means for performing recognition and adaptation further outputs the adapted acoustic training models that yielded the best hypothesis into a database of acoustic training models, wherein the database of acoustic training models will grow as new adapted acoustic training models generate new best hypothesis results for scenarios that include at least one of: changing environmental conditions, deviation of a speaker from the standard language, and deviation of a sound from the standard sound characteristics.

71. A system for fast on-line automatic speaker/environment adaptation as set forth in claim 70, wherein the database of acoustic training models is tailored for non-standard speaker recognition, suitable for speech/speaker recognition applications comprising INS surveillance, national security surveillance, airport surveillance, automatic-speech telephone queries, air travel reservations, voice activated command and control systems, and automatic translation.

72. A system for fast on-line automatic speaker/environment adaptation as set forth in claim 42, wherein, in the means for performing recognition and adaptation, the acoustic training models are stored in the current list of acoustic training models by grouping together the acoustic training models representative of a unit of sound, thus forming clusters of models, and wherein each cluster of models representative of a unit of sound has an outer layer.

73. A system for fast on-line automatic speaker/environment adaptation as set forth in claim 72, wherein the means for performing recognition and adaptation further uses an Euclidean distance measure to select only the associated training models located on the outer layer of each cluster to be adapted, furthermore wherein the number of selected acoustic training models varies from utterance to utterance.

74. A system for fast on-line automatic speaker/environment adaptation as set forth in claim 42, wherein the chosen acoustic training models associated with the best hypothesis have a set of mixture components, and wherein the means for adaptation estimates distortion parameters for each chosen associated acoustic training model and for a chosen sub-set of mixture components from each chosen associated acoustic training model.

75. A system for fast on-line automatic speaker/environment adaptation as set forth in claim 74, wherein each mixture component has a probability associated with it, and the chosen sub-set of mixture components is selected based on a fixed probability threshold value set a priori by a user, wherein only mixture components selected for adaptation are mixture components whose associated probability is at least equal to the chosen probability threshold value, and wherein the number of selected mixture components varies from utterance to utterance.

76. A system for fast on-line automatic speaker/environment adaptation as set forth in claim 42, wherein the associated acoustic training models differ from acoustic training models representing the current sound disturbances, and wherein distortion parameters consist of a bias mean value and a bias standard deviation value, representing differences between a mean and standard deviation of the associated acoustic training models, and a mean and standard deviation of the acoustic training models representing the current sound disturbances.

77. A system for fast on-line automatic speaker/environment adaptation as set forth in claim 76, wherein, in the means for performing recognition and adaptation, the associated acoustic training models are adapted by incorporating the distortion parameters representative of current sound disturbances selected from a group consisting of changing environmental conditions, deviation of a speaker from the standard language, and deviation of a sound from the standard sound characteristics.

78. A system for fast on-line automatic speaker/environment adaptation as set forth in claim 77, wherein the means for performing recognition and adaptation initializes the distortion parameters of the chosen associated acoustic training models to an initial bias mean value and an initial bias standard deviation value.

79. A system for fast on-line automatic speaker/environment adaptation as set forth in claim 78, further comprising means for computing an auxiliary function based on the initial bias mean value and the initial bias standard deviation value of the distortion parameters.

80. A system for fast on-line automatic speaker/environment adaptation as set forth in claim 79, further comprising means for iteratively performing Estimation Maximization of the auxiliary function over the chosen subsets of associated acoustic training models and mixture components, and wherein the Estimation Maximization results in finding the distortion parameters that model most closely current environmental conditions, a present non-standard speaker acoustic model, or a present distorted sound acoustic model.

81. A system for fast on-line automatic speaker/environment adaptation as set forth in claim 77, wherein the chosen subset of associated acoustic training models is adapted by adding the distortion parameters, the distortion parameters consisting of a bias mean value and a bias standard deviation value, to the mean and standard deviation of the previously chosen associated acoustic training models, and wherein the chosen associated acoustic training models that have been adapted are labeled as adapted acoustic training models.

82. A system for fast on-line automatic speaker/environment adaptation as set forth in claim 42, wherein in the means for performing recognition and adaptation, in the computing of an acoustic score, the acoustic training models include one of: associated acoustic training models or adapted acoustic training models; and the computing is performed by determining the best hypothesis using the acoustic training models and then combining a proper subset of the resulting associated probabilities from the best hypothesis, wherein the resulting associated probabilities from the best hypothesis used to determine the acoustic score comprise the probability associated with a unit of sound and a set of probabilities associated with that unit of sound transitioning to several other units of sound.

83. A computer program product for fast on-line automatic speaker/environment adaptation suitable for speech/speaker recognition in the presence of changing environmental conditions, the computer program product comprising means, stored on a computer readable medium for:
receiving an acoustic input signal;
performing front-end processing on the acoustic input signal, wherein the front-end processing generates MEL frequency cepstral features representative of the acoustic input signal;
performing recognition and adaptation by:
providing the MEL frequency cepstral features to a speech recognizer, wherein the speech recognizer utilizes the MEL frequency cepstral features and a current list of acoustic training models to determine at least one best hypothesis;
receiving, from the speech recognizer, at least one best hypothesis, associated acoustic training models, and associated probabilities;
computing a pre-adaptation acoustic score by recognizing the utterance using the associated acoustic training models;
choosing acoustic training models from the associated acoustic training models;
performing adaptation on the chosen associated acoustic training models;
computing a post-adaptation acoustic score by recognizing the utterance using the adapted acoustic training models;
comparing the pre-adaptation acoustic score with the post-adaptation acoustic score to check for improvement; modifying the current list of acoustic training models to include the adapted acoustic training models, if the acoustic score improved after performing adaptation; and performing recognition and adaptation iteratively until the acoustic score ceases to improve;
choosing the best hypothesis as recognized words once the acoustic score ceases to improve; and
outputting the recognized words.

84. A computer program product for fast on-line automatic speaker/environment adaptation as set forth in claim 83, wherein the means for receiving an acoustic input signal from an audio inputting device, the audio inputting device is selected from a group consisting of a microphone, a radio, a cellular wireless telephone, a telephone receiver, and an audio recording medium used to gather data in random environments and from non-standard speakers, the audio recording medium selected from a group consisting of an audio Compact Disk (CD), a cassette tape, a Digital Versatile Disk/Digital Video Disk (DVD), a video cassette, and a Long Play (LP) record.

85. A computer program product for fast on-line automatic speaker/environment adaptation as set forth in claim 84, wherein in the means for performing recognition and adaptation, the current list of acoustic training models available in the speech recognizer is comprised of a plurality of acoustic training models that are dependent on a speaker or on environmental conditions.

86. A computer program product for fast on-line automatic speaker/environment adaptation as set forth in claim 85, wherein, in the means for performing recognition and adaptation, the speech recognizer comprises means for:
pattern matching;
word generation; and
sentence generation.

87. A computer program product for fast on-line automatic speaker/environment adaptation as set forth in claim 86, wherein, in the means for performing recognition and adaptation, the speech recognizer inputs the MEL frequency cepstral features and the current list of acoustic training models into a pattern matching act, and the pattern matching act produces a set of units of sound.

88. A computer program product for fast on-line automatic speaker/environment adaptation as set forth in claim 87, wherein, in the means for performing recognition and adaptation, the means for pattern matching of the speech recognizer comprises the means for:
generating a probability distribution function representing the inputted MEL frequency cepstral features;
comparing the probability distribution function representing the inputted MEL frequency cepstral features with a plurality of probability distribution functions corresponding to all acoustic training models stored in the current list of acoustic training models; and
selecting a set of units of sound that correspond to closer matches between the probability distribution function of the MEL frequency cepstral features and the probability distribution functions of all the models in the current list of acoustic training models.

89. A computer program product for fast on-line automatic speaker/environment adaptation as set forth in claim 88, wherein the MEL-frequency cepstral representation has acoustic landmarks of varying robustness, and where the means for pattern matching locates the acoustic landmarks from the MEL-frequency cepstral representation, and embeds the acoustic landmarks into an acoustic network.

90. A computer program product for fast on-line automatic speaker/environment adaptation as set forth in claim 89, wherein the acoustic network includes segments, and wherein the means for pattern matching further maps the segments in the acoustic network to units of sound hypotheses using a set of automatically determined acoustic parameters and acoustic training models in conjunction with pattern recognition algorithms.

91. A computer program product for fast on-line automatic speaker/environment adaptation as set forth in claim 90, wherein in the means for pattern matching, a phoneme corresponds to a unit of sound and the means for pattern matching outputs phoneme hypotheses.

92. A computer program product for fast on-line automatic speaker/environment adaptation as set forth in claim 91, further comprising means for getting phonotactic models for the means for word generation from a plurality of available phonotactic models, wherein the phonotactic models are independent from a speaker or from environmental conditions.

93. A computer program product for fast on-line automatic speaker/environment adaptation as set forth in claim 92, wherein the means for word generation generates a set of word hypotheses by comparing the set of units of sound with the phonotactic models.

94. A computer program product for fast on-line automatic speaker/environment adaptation as set forth in claim 93, further comprising means for getting language models for the means for sentence generation from a plurality of available language models, wherein the language models are independent from a speaker or from environmental conditions.

95. A computer program product for fast on-line automatic speaker/environment adaptation as set forth in claim 94, wherein the means for sentence generation generates a set of sentence hypotheses by comparing the set of word hypotheses and the language models.

96. A computer program product for fast on-line automatic speaker/environment adaptation as set forth in claim 95, wherein the speech recognizer outputs the set of sentence hypotheses produced by the means for sentence generation, and a set of likelihood measures, wherein each likelihood measure is associated with a sentence hypothesis in the set of sentence hypotheses.

97. A computer program product for fast on-line automatic speaker/environment adaptation as set forth in claim 96, wherein the likelihood measure for each sentence hypothesis comprises a probability associated with a unit of sound, a set of probabilities associated with that unit of sound transitioning to several other units of sound, a probability associated with a word, and a set of probabilities associated with the word transitioning to several other words.

98. A computer program product for fast on-line automatic speaker/environment adaptation as set forth in claim 97, wherein the means for performing recognition and adaptation chooses a hypothesis with a highest likelihood measure to be a best hypothesis, and outputs at least one best hypothesis and its associated acoustic training models.

99. A computer program product for fast on-line automatic speaker/environment adaptation as set forth in claim 98, wherein, in the means for performing recognition and adaptation, the acoustic training models are stored in the current list of acoustic training models by grouping together the acoustic training models representative of a unit of sound, thus forming clusters of models, and wherein each cluster of models representative of a unit of sound has an outer layer.

100. A computer program product for fast on-line automatic speaker/environment adaptation as set forth in claim 99, wherein the means for performing recognition and adaptation further uses an Euclidean distance measure to select only the associated training models located on the outer layer of each cluster to be adapted, furthermore wherein the number of selected acoustic training models varies from utterance to utterance.

101. A computer program product for fast on-line automatic speaker/environment adaptation as set forth in claim 100, wherein the chosen acoustic training models associated with the best hypothesis have a set of mixture components, and wherein the means for adaptation estimates distortion parameters for each chosen associated acoustic training model and for a chosen sub-set of mixture components from each chosen associated acoustic training model.

102. A computer program product for fast on-line automatic speaker/environment adaptation as set forth in claim 101, wherein each mixture component has a probability associated with it, and the chosen sub-set of mixture components is selected based on a fixed probability threshold value set a priori by a user, wherein only mixture components selected for adaptation are mixture components whose associated probability is at least equal to the chosen fixed probability threshold value, and wherein the number of selected mixture components varies from utterance to utterance.

103. A computer program product for fast on-line automatic speaker/environment adaptation as set forth in claim 102, wherein, in the means for performing recognition and adaptation, the associated acoustic training models are adapted by incorporating distortion parameters representative of current sound disturbances selected from a group consisting of changing environmental conditions, deviation of a speaker from the standard language, and deviation of a sound from the standard sound characteristics.

104. A computer program product for fast on-line automatic speaker/environment adaptation as set forth in claim 103, wherein the associated acoustic training models differ from acoustic training models representing the current sound disturbances, and wherein the distortion parameters consist of a bias mean value and a bias standard deviation value, representing differences between a mean and standard deviation of the associated acoustic training models, and a mean and standard deviation of the acoustic training models representing the current sound disturbances.

105. A computer program product for fast on-line automatic speaker/environment adaptation as set forth in claim 104, wherein the means for performing recognition and adaptation initializes the distortion parameters of the chosen associated acoustic training models to an initial bias mean value and an initial bias standard deviation value.

106. A computer program product for fast on-line automatic speaker/environment adaptation as set forth in claim 105, further comprising means for computing an auxiliary function based on the initial bias mean value and the initial bias standard deviation value of the distortion parameters.

107. A computer program product for fast on-line automatic speaker/environment adaptation as set forth in claim 106, further comprising means for iteratively performing Estimation Maximization of the auxiliary function over the chosen subsets of associated acoustic training models and mixture components, and wherein the Estimation Maximization results in finding the distortion parameters that model most closely current environmental conditions, a present non-standard speaker acoustic model, or a present distorted sound acoustic model.

108. A computer program product for fast on-line automatic speaker/environment adaptation as set forth in claim 107, wherein the chosen subset of associated acoustic training models is adapted by adding the distortion parameters, the distortion parameters consisting of a bias mean value and a bias standard deviation value, to the mean and standard deviation of the previously chosen associated acoustic training models, and wherein the chosen associated acoustic training models that have been adapted are labeled as adapted acoustic training models.

109. A computer program product for fast on-line automatic speaker/environment adaptation as set forth in claim 108, wherein in the means for performing recognition and adaptation, in the computing of an acoustic score, the acoustic training models include one of: associated acoustic training models or adapted acoustic training models; and the computing is performed by determining the best hypothesis using the acoustic training models and then combining a proper subset of the resulting associated probabilities from the best hypothesis, wherein the resulting associated probabilities from the best hypothesis used to determine the acoustic score comprise the probability associated with a unit of sound and a set of probabilities associated with that unit of sound transitioning to several other units of sound.

110. A computer program product for fast on-line automatic speaker/environment adaptation as set forth in claim 109, wherein, in the means for outputting the recognized words, the outputting device is selected from a group consisting of a speaker-unit coupled with a computer system, a computer monitor, a electromagnetic wave representation of an audio transmission, an audio Compact Disk (CD), a cassette tape, a Digital Versatile Disk/Digital Video Disk (DVD), a video cassette, and a Long Play (LP) record.

111. A computer program product for fast on-line automatic speaker/environment adaptation as set forth in claim 83, wherein the means for performing recognition and adaptation further outputs the adapted acoustic training models that yielded the best hypothesis into a database of acoustic training models, wherein the database of acoustic training models grows as new adapted acoustic training models generate new best hypothesis results for scenarios that include at least one of: changing environmental conditions, deviation of a speaker from standard language, and deviation of a sound from standard sound characteristics.

112. A computer program product for fast on-line automatic speaker/environment adaptation as set forth in claim 111, wherein the database of acoustic training models is tailored for non-standard speaker recognition, suitable for speech/speaker recognition applications comprising INS surveillance, national security surveillance, airport surveillance, automatic-speech telephone queries, air travel reservations, voice activated command and control systems, and automatic translation.

113. A computer program product for fast on-line automatic speaker/environment adaptation as set forth in claim 83, wherein, in the means for performing recognition and adaptation, the acoustic training models are stored in the current list of acoustic training models by grouping together the acoustic training models representative of a unit of sound, thus forming clusters of models, and wherein each cluster of models representative of a unit of sound has an outer layer.

114. A computer program product for fast on-line automatic speaker/environment adaptation as set forth in claim 113, wherein the means for performing recognition and adaptation further uses an Euclidean distance measure to select only the associated training models located on the outer layer of each cluster to be adapted, furthermore wherein a number of selected acoustic training models varies from utterance to utterance.

115. A computer program product for fast on-line automatic speaker/environment adaptation as set forth in claim 83, wherein the chosen acoustic training models associated with the best hypothesis have a set of mixture components, and wherein the means for adaptation estimates distortion parameters for each chosen associated acoustic training model and for a chosen sub-set of mixture components from each chosen associated acoustic training model.

116. A computer program product for fast on-line automatic speaker/environment adaptation as set forth in claim 115, wherein each mixture component has a probability associated with it, and the chosen sub-set of mixture components is selected based on a fixed probability threshold value set a priori by a user, wherein only mixture components selected for adaptation are mixture components whose associated probability is at least equal to the chosen probability threshold value, and wherein the number of selected mixture components varies from utterance to utterance.

117. A computer program product for fast on-line automatic speaker/environment adaptation as set forth in claim 83, wherein the associated acoustic training models differ from acoustic training models representing current sound disturbances, and wherein distortion parameters consist of a bias mean value and a bias standard deviation value, representing differences between a mean and standard deviation of the associated acoustic training models, and a mean and standard deviation of the acoustic training models representing the current sound disturbances.

118. A computer program product for fast on-line automatic speaker/environment adaptation as set forth in claim 117, wherein, in the means for performing recognition and adaptation, the associated acoustic training models are adapted by incorporating the distortion parameters representative of current sound disturbances selected from a group consisting of changing environmental conditions, deviation of a speaker from standard language, and deviation of a sound from standard sound characteristics.

119. A computer program product for fast on-line automatic speaker/environment adaptation as set forth in claim 118, wherein the means for performing recognition and adaptation initializes the distortion parameters of the chosen associated acoustic training models to an initial bias mean value and an initial bias standard deviation value.

120. A computer program product for fast on-line automatic speaker/environment adaptation as set forth in claim 119, further comprising means for computing an auxiliary function based on the initial bias mean value and the initial bias standard deviation value of the distortion parameters.

121. A computer program product for fast on-line automatic speaker/environment adaptation as set forth in claim 120, further comprising means for iteratively performing Estimation Maximization of the auxiliary function over the chosen subsets of associated acoustic training models and mixture components, and wherein the Estimation Maximization results in finding the distortion parameters that model most closely current environmental conditions, a present non-standard speaker acoustic model, or a present distorted sound acoustic model.

122. A computer program product for fast on-line automatic speaker/environment adaptation as set forth in claim 118, wherein the chosen subset of associated acoustic training models is adapted by adding the distortion parameters, the distortion parameters consisting of a bias mean value and a bias standard deviation value, to the mean and standard deviation of the previously chosen associated acoustic training models, and wherein the chosen associated acoustic training models that have been adapted are labeled as adapted acoustic training models.

123. A computer program product for fast on-line automatic speaker/environment adaptation as set forth in claim 83, wherein, in the means for performing recognition and adaptation, in the computing of an acoustic score, the acoustic training models include one of: associated acoustic training models or adapted acoustic training models; and the computing is performed by determining the best hypothesis using the acoustic training models and then combining a proper subset of resulting associated probabilities from the best hypothesis, wherein the resulting associated probabilities from the best hypothesis used to determine the acoustic score comprise the probability associated with a unit of sound and a set of probabilities associated with that unit of sound transitioning to several other units of sound.

* * * * *